United States Patent [19]

Eyman et al.

[11] Patent Number: 5,089,245
[45] Date of Patent: Feb. 18, 1992

[54] CATALYST FOR SUPPORTED MOLTEN SALT CATALYTIC DEHYDROGENATION OF METHANOL

[75] Inventors: Darrell P. Eyman; Katherine B. Gloer; Andrew D. Schmitz, all of Iowa City, Iowa

[73] Assignee: Accel Catalysis, Inc., Iowa City, Iowa

[21] Appl. No.: 506,641

[22] Filed: Apr. 9, 1990

[51] Int. Cl.$^5$ .......................... C01B 3/02; C01B 31/00
[52] U.S. Cl. ............................ 423/415 A; 423/648.1
[58] Field of Search ...................... 423/648.1, 415 A

[56] References Cited

U.S. PATENT DOCUMENTS

| | | | |
|---|---|---|---|
| 2,010,427 | 8/1935 | Eversole | 423/648.1 |
| 2,280,673 | 4/1942 | Thomas | 423/415 A |
| 3,385,668 | 5/1968 | Schunemann | 423/415 A |
| 4,780,300 | 10/1988 | Yokoyama et al. | 423/648.1 |
| 4,855,267 | 8/1989 | Cheng | 423/648.1 |
| 4,865,624 | 9/1989 | Okada | 423/648.1 |
| 4,916,104 | 4/1990 | Isogai et al. | 423/648.1 |

FOREIGN PATENT DOCUMENTS

| 7255 | 1/1982 | Japan | 423/648.1 |
|---|---|---|---|
| 1010574 | 11/1965 | United Kingdom | 423/648.1 |

Primary Examiner—Wayne A. Langel
Attorney, Agent, or Firm—Henderson & Sturm

[57] ABSTRACT

The present invention involves conversion of methanol, a relatively abundant and inexpensive, yet low energy fuel, to carbon monoxide and hydrogen, which have higher heats of combustion. The catalytic dehydrogenation of methanol is an endothermic process.

$$\text{heat} + CH_3OH \rightleftharpoons CO + 2H_2 \qquad (1)$$

A new and efficient catalyst technology which promotes high methanol conversion and excellent selectivity for CO and $H_2$ in this reaction would have several practical applications. Results clearly demonstrate that it is feasible to employ SMSC technology in the development of catalyst systems with commercial applications for methanol dehydrogenation.

4 Claims, 11 Drawing Sheets

1) $H_2O$ Trap
2) $O_2$ Trap
3) Flowmeter
4) Bubble Meter
5) Liquid Reservoir
6) Filter
7) Liquid Pump
8) Fluidized Sand Bath
9) Reactor and Preheater
10) Thermocouple
11) 6-Way Valve
12) G.C.
13) Vent 1) $H_2O$ Trap
2) $O_2$ Trap
3) Flowmeter
4) Bubble Meter
5) Liquid Reservoir
6) Filter
7) Liquid Pump
8) Fluidized Sand Bath
9) Reactor and Preheater
10) Thermocouple
11) 6-Way Valve
12) G.C.
13) Vent

CATALYST FOR SUPPORTED MOLTEN SALT CATALYTIC DEHYDROGENATION OF METHANOL

TECHNICAL FIELD

This invention relates to catalysts and catalytic processes, and more particularly to applying a technique called Supported Molten Salt Catalysis (SMSC) to the process of methanol dehydrogenation.

BACKGROUND ART

Heterogeneous Catalysis

Heterogeneous catalysis involves materials which are dispersed as particles too large to be considered as molecular in nature. This is in contrast to homogeneous catalysts which involve the catalyst material dissolved in a liquid solvent phase. The heterogeneous catalyst particles are microcrystallites which are attached to or embedded in supports which themselves may or may not play a role in the reactions influenced by the catalyst. The reactant-catalyst interaction occurs only on the surface of the microcrystallites. Materials used as heterogeneous catalysts include metals, metal mixtures, intermetallic compounds, and a wide range of metal compounds including metal oxides, sulfides, halides, other binary metal compounds, hydroxides, and polynuclear metallates with oxides, sulfides, phosphates, and halides. The effectiveness of a heterogeneous catalyst in increasing the rate of the reaction of interest, is usually very sensitive to the method of preparation. The details of catalyst preparation are seldom revealed for commercial catalysts and the maintenance of a proprietary nature for this technology is often the major method of market protection.

Supported Liquid Phase Catalysis

In the technique of Supported Liquid-Phase Catalysis (SLPC), a homogeneous liquid catalyst solution is coated on the pore walls of a porous support so as to occupy a fraction of the pore space, much like a chromatographic packing supporting a liquid phase. The gaseous or vapor phase reactants diffuse through the residual gas pore space as well as through the liquid film and react within the thin liquid film to produce volatile products which then diffuse back out. When soluble catalysts are used, this technique combines the attractive features of homogeneous catalysis, such as high specificity and molecular dispersion of the catalyst, with those of heterogeneous catalysis such as large interfacial area, less corrosion, ease of separation, and use of conventional equipment like packed-bed and fluidized-bed reactors. The major limitation of SLPC is the requirement that for adequate stability the reactants and products must be in gaseous or vapor form at the reaction conditions, while the catalyst solution must be essentially non-volatile. This has so far been the major stumbling block in the industrial application of SLPC.

Applicants have established that the use of molten salt eutectics as the liquid phase reaction medium overcomes the solution volatility problem commonly encountered in SLPC (vide supra). Molten salts have been used as the solvent for transition metal complex catalysts in what is better termed supported molten salt catalysis (SMSC). Others have reported the use of catalysts which are homogeneously dispersed in molten salts used in bulk or pool form. In this form, diffusion limitations hinder mass transfer and corrosion problems are very severe. In contrast to these difficulties, the SMSC method does not present diffusion limitations because of the very thin films through which the reactants and products must move. In addition, corrosion problems are reduced because the molten salt is contained within the support, minimizing contact with the walls of the containment vessel.

Innumerable industrial applications of SMSC are possible. Homogeneous dispersion of catalysts is an application in which a large number of commercially important processes might be improved using the method of SMSC. Most homogenous catalytic species that are in ionic form can be dispersed using molten salt eutectics. A large variety of such eutectics is available with melting points ranging from below 100° F. to above 2,000° F. Consequently, the technique is potentially applicable to any reaction system.

Related Patents and Literature References

A search of the literature has revealed a few patents in which transition metal compounds are used as homogeneous catalysts dissolved in fused salts. (See references in Knifton, J. F., Proc. Symp. Inc.—Univ. Coop. Chem., Dept. Chem., Texas A&M, 1983, 115, Shapiro, B., Ed.) In almost every case, the fused salt is used in bulk or pool form as a reaction solvent. The major application of this catalyst technology is in carbon monoxide hydrogenation: synthesizing higher value chemicals from carbon monoxide and hydrogen. A patent issued to Knifton describes the use of various ruthenium compounds dispersed in low melting molten salts in the catalytic conversion of carbon monoxide and hydrogen to ethylene glycol. (Knifton, J. F., U.S. Pat. No. 4,265,828, (1981)). Although no mention is made of the solubility of these catalyst precursors in the molten salt, Knifton has reported in the literature that the process involves a homogeneous catalyst.

A second related patent, issued to Rony, describes the use of supported molten salt catalysis with homogeneously dispersed transition metal compounds. (Rony, P. R., et al., U.S. Pat. No. 3,855,307 and Rony, P. R., Belgian Patent 711,042 (1968).) The claims in this patent involve hydroformylation of unsaturated hydrocarbons using an arylphosphine complex of rhodium or rhodium carbonyl bis triphenyl chloride as homogeneously dispersed catalysts. Two commercial processes have used supported molten salt catalysis technology. The earliest was the oxychlorination of olefins in the Deacon process which used a melt of $CuCl_2/CuCl/KCl$/rare-earth halides supported on silica gel or pumice. (Kenney, C. N., Catal. Rev. Sci. Eng. 1975, 11, 197.) Undoubtedly, the most widely used application of a supported molten salt catalyst is the catalytic oxidation of $SO_2$ with $V_2O_5/K_2O$ molten catalyst supported on porous silica. (Livbjerg, H.: Jensen, K. F.; Villadsen. J., J. Catal., 1976, 45, 216).

The successful use of SMSC for the Wacker process has been reported. (Rao, V., Datta, R., J. Catal., 1988, 114, 377). The catalyst used in these studies was a $PdCl_2/CuCl_2$ solution in a $CuCl/KCl$ eutectic supported on porous silica.

Two other literature references suggest or report the use of metal compound catalysts dispersed in molten salts in pool form. (Mamantov, G.; Walters, S. E., Proc. Electrochem. Soc., 1984, 84-3, 90 and Parshall, G., J. Am. Chem. Soc., 1972, 88, 8718.) In neither case is the molten salt supported. Synthesis and/or Dehydrogenation of Methanol For many years, Cu/ZnO/Al$_2$O$_3$ catalysts have been accepted as standard conventional catalysts for the synthesis and/or dehydrogenation of methanol. (Klier, K., Adv. Cat., 1982, 31, 243). Although the identity of the active phase in these catalysts is still a subject of debate (Klier, K., Adv. Cat., 1982, 31, 243; Ghiotti, G., Boccuzzi, F., Catal. Rev. Sci. Eng., 1987, 29 (2&3), 151; Klier, K., Herman, R. G., Nunan, J. G., Smith, K. J., Bogdan, C. E., Young, C. W., Santiesteban, J. G., in "Methane Conversion", Ed. Bibby, D. M., Chang, C. D., Howe, R. F., Yurchak, S. L., Studies in Surface Science and Catalysis, Vol. 36, Elsevier, New York, 1988, 109; Chu, P. J., Gerstein, B. C., Sheffer, G. R., King, T. S., J. Catal., 1989, 115, 194; and Sheffer, G. R., King, T. S., J. Catal., 1989, 115, 376.), it has been proposed that the active species is a mixture of Cu(I) and copper metal in synergism with ZnO. The high activity of promoted copper-containing catalysts in synthesis gas conversions seems to be quite general. For example, under low temperature conditions where the formation of methyl formate is thermodynamically favored, pumice-supported copper catalysts were promoted by the addition of Group IA, IIA, and transition metal oxides. These oxides are thought to stabilize the Cu(I). (Ai, M., Appl. Catal., 1984, 11, 259). In addition, the high activity of Cu(I)-containing, alkali metal-promoted catalysts in methanol synthesis has recently been reported. (Chu, P. M., Gerstein, B. C., Sheffer, G. R., King, T. S., J. Catal., 1989, 115, 194).

Current methanol dehydrogenation catalyst technology is limited due to rapid decrease in catalytic activity and poor resiliency when heated to high temperatures. Those concerned with this and other problems recognize the need for an improved catalyst for dehydrogenation of methanol.

·DISCLOSURE OF THE INVENTION

The process of the present invention involves conversion of methanol, a relatively abundant and inexpensive, yet low energy fuel, to carbon monoxide and hydrogen, which have higher heats of combustion. The catalytic dehydrogenation of methanol is an endothermic process. When methanol is used as a fuel, the dehydrogenation reaction can be used for cooling by heat consumption as shown in Equation 1.

$$\text{heat} + CH_3OH \rightleftharpoons CO + 2H_2 \qquad (1)$$

A new and efficient catalyst technology which promotes high methanol conversion and excellent selectivity for CO and H$_2$ in this reaction would have several practical applications. Results contained herein clearly demonstrate that it is feasible to employ SMSC technology in the development of catalyst systems with commercial applications for methanol dehydrogenation.

Supported molten salt catalysts containing copper (I) are highly effective in catalyzing the endothermic dehydrogenation of methanol, both alone or promoted by an added co-catalyst, zinc oxide (ZnO). These findings are particularly significant because the molten salt itself is a good catalyst for this transformation despite the absence of ZnO. Metal oxides other than ZnO may also act as promoters. Alkali metal, alkaline earth metal, transition metal and non-metal oxides are all possible candidates. All of these materials have been used as promoters in alcohol (methanol) synthesis catalysts and/or methanol dehydrogenation catalysts.

Supported molten salt catalysts were prepared by impregnation of solutions containing the component salts onto porous supports SiO$_2$ and Al$_2$O$_3$. Other supports which could be used include TiO$_2$, ZrO$_2$, Cr$_2$O$_3$, MgO, and mixed oxides. After preparation and pretreatment, the catalysts were tested in an annular type reactor designed to permit evaluation of the endotherm that occurs as a result of the dehydrogenation reaction. Several operational parameters, including temperature, pressure, and methanol flow rate, were varied to determine their influence on methanol conversion and product selectivity. The liquid hourly space velocity, or LHSV, is a function of methanol flow rate and catalyst volume. Preliminary results indicate the ability to achieve excellent conversion at high LHSV values (up to 300h$^{-1}$) using the supported molten salt catalysts tested thus far. These results are unmatched by previously defined catalysts.

Evaluations of catalyst effectiveness were based on the degree of conversion of methanol to products. Selectivity to CO and H$_2$ is also of interest if the process is to be used for cooling because several of the possible side reactions are exothermic. In addition, it is important that the catalysts endure long test periods without deactivation and exhibit resiliency in activity when heated to high temperatures (>1000° F.), followed by cooling to more moderate temperatures. Supported molten salt methanol dehydrogenation catalysts of the present invention surpass previously defined catalysts in all of these areas.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

The following examples are illustrative of the best mode for carrying out the invention. They are obviously not to be construed as limitative of the invention since various other embodiments can readily be evolved in view of the teachings provided herein.

EXPERIMENTAL SEQUENCE

The following general sequence was used in the experimental evaluation of the SMSC catalysts:

1) the catalyst components were loaded onto porous supports and catalyst precursors were converted to active form, where applicable;

2) the supported catalysts were diluted with SiC and loaded into the reactor;

3) reactor contents were purged with dry He gas at elevated temperature to remove oxygen and water;

4) the reactor/preheater unit was heated to the desired thermostated reaction temperature;

5) methanol flow was initiated and pressure was controlled by a restricting valve downstream from the reactor; and 6) degree of conversion and product ratios were determined by gas chromatographic (GC) analysis of the product stream sampled with a gas sampling valve.

A commercial sample of $CuO/ZnO/Al_2O_3$ catalyst, United Catalysts, Inc., UCI-L-1968, was tested under reaction conditions to compare activities of molten salt catalysts with the activity of a conventional methanol synthesis catalyst.

EXPERIMENTAL

System Design

A laboratory scale fixed-bed reactor system was designed and constructed to test the activity of the prepared catalysts in the dehydrogenation reaction. (See FIG. 1). The system is divided into three sections: a feed manifold, a preheater/reactor unit, and an analytical workstation.

Figure 1:
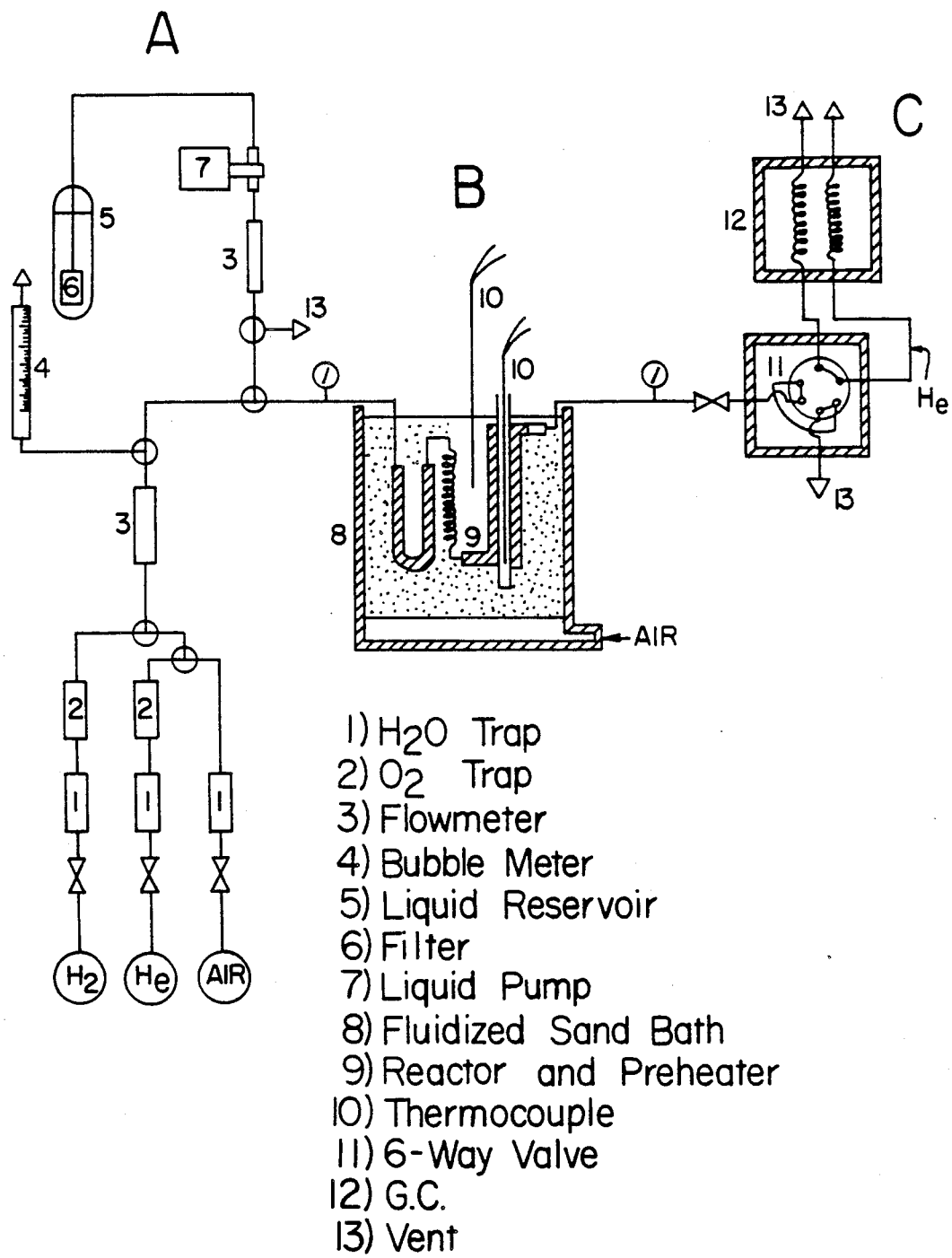
FIG. 1 is a schematic diagram of the dehydrogenation apparatus.

The feed manifold, section A, FIG. 1, supplies gases for pretreatment of the catalysts in the reactor and also functions as the source for liquid reactants (methanol, in this case). Dried and distilled methanol is pumped into the preheater/reactor unit using a low pressure liquid pump (FMI model QSY-2). The liquid flow rate is monitored using a flowmeter.

The preheater section of the preheater/reactor unit, section B, FIG. 1, provides a large surface area for vaporization of liquid methanol before it is passed into the reactor. In addition, the gaseous methanol is heated to reaction temperature in the preheater before coming into contact with the catalyst. The preheater section consists of a stainless steel U-tube (⅜" outside diameter by 0.227" inside diameter, 16" long filled with 30/40 mesh size SiC) which is connected to a coiled tube (⅛" outside diameter by 0.085" inside diameter, 20 feet long).

The analytical workstation, section C, FIG. 1, contains modern gas chromatographic and data analysis instrumentation. The gas chromatograph, a Shimadzu GC-9A, allows convenient analysis of the product stream.

Qualitative Analysis of the Products by Gas Chromatography

The methodology employed for qualitative analysis of the reactor effluent is analogous to published procedures (Poutsma, M., Elek, P., Ibarbia, P., Risch, A., Rabo, J., J. Catal. 1978, 52, 157) for on-line sampling of the product stream from the reactor using a two-column GC configuration. Total reaction time was recorded with reference to the time of introduction of methanol into the reactor. All chromatographic peaks were identified by comparison of their GC retention times with those of standard samples. The assignment of several product components was confirmed by mass spectrometric analysis.

Product Quantitation Using Thermal Conductivity Detection

The method of internal normalization of peak areas was used to obtain weight percentages of each component detected by GC analysis. (Rosie, D. M., Barry, E. F., J. Chromatog. Sci., 1973, 11, 237). The conversion from peak area percent to component weight percent is accomplished by correcting chromatogram peak areas using well established relative weight response factors for thermal conductivity detection. These response factors are based on the detector response for a known amount of a given component relative to that for benzene. The relative weight response factors for dimethyl ether and methyl formate were not reported, but reliable values were estimated using group cross section data. (Rosie, D. M., Barry, E. F., J. Chromatog. Sci., 1973, 11, 237). Hydrogen could not be quantitated using helium carrier gas, thus, component weight percentages listed in the tables were determined by dividing the corrected response for a given component by the sum of all component corrected response values, neglecting hydrogen.

CATALYSTS

The catalysts used for methanol dehydrogenation were supported molten salt catalysts. A commercial heterogenous methanol synthesis catalyst was also tested for purposes of comparison.

Liquid Loading

The liquid loading, q, of the molten salt in the pores of the support is an important variable to be evaluated in SMSC studies. This variable is defined as:

$$q = \frac{\text{Volume of molten salt occupying the pores of the carrier}}{\text{Total pore volume}}$$

The liquid loading can be varied from zero, no molten salt catalyst present, to a value of 1, where the internal pores are completely filled with the molten salt/catalyst mixture. Physical properties of the two catalyst supports used are presented in Table 1. Tables 2 and 3 provide the calculated values for molten salt liquid film thickness and void space diameter as a function of liquid loading for these two supports, assuming uniform loading of cylindrically shaped pores.

TABLE 1

| | SiO$_2$<br>PQ, Inc.; 1022G | Al$_2$O$_3$<br>UCI; T-2432 |
|---|---|---|
| Composition | 99.5% SiO$_2$ | 99.0% Al$_2$O$_3$ |
| Surface area | 202 m$^2$/g | 85 m$^2$/g |
| Average pore volume | 1.46 mL/g | 0.70 mL/g |
| Average pore diameter | 288 A | 350 A |

PQ, Inc.: Philadelphia Quartz, Inc.
UCI: United Catalysts, Inc.

TABLE 2
MOLTEN SALT FILM THICKNESS AS A FUNCTION OF LIQUID LOADING (SiO$_2$)

| q | Film Thickness (A) | Void Diameter (A) |
|---|---|---|
| 0.10 | 7 | 274 |
| 0.20 | 15 | 258 |
| 0.30 | 24 | 240 |
| 0.40 | 33 | 222 |
| 0.50 | 42 | 204 |
| 0.60 | 53 | 182 |
| 0.70 | 65 | 158 |
| 0.80 | 80 | 128 |
| 0.90 | 99 | 90 |

TABLE 3
MOLTEN SALT FILM THICKNESS AS A FUNCTION OF LIQUID LOADING (Al$_2$O$_3$)

| q | Film Thickness (A) | Void Diameter (A) |
|---|---|---|
| 0.10 | 9 | 332 |
| 0.20 | 18 | 314 |
| 0.30 | 29 | 293 |
| 0.40 | 39 | 271 |
| 0.50 | 51 | 247 |
| 0.60 | 64 | 221 |
| 0.70 | 79 | 192 |
| 0.80 | 97 | 156 |
| 0.90 | 120 | 111 |

Catalyst Preparation Procedures

Supported Molten Salt Catalysts were prepared by impregnating solutions containing the components of the molten salt into the pores of silica or alumina supports as described below.

The melting point of the CuCl/KCl mixture varies with composition, as described by its phase diagram. (Janz, G. J., J. Phys. Chem. Ref. Data, 1975, 4, 1027). The lowest melting mixture occurs at approximately 68 molpercent CuCl, mp. 277° F. Catalyst containing two different molten salt compositions were examined.

Catalysts were prepared and tested with and without dispersed ZnO microcrystallites. Sequential loading of the catalyst components for ZnO-containing catalysts was necessary to prevent undesired side reactions in the acidic aqueous solution needed for impregnation of the water-insoluble CuCl. The weight percents of catalyst components were calculated based on the amounts of salts added to the support, or by weight gain of the support after addition of the components. The compositions of the catalysts used are summarized in Table 4.

TABLE 4
CATALYST COMPOSITION

| Catalyst | Wt. % CuCl | Wt. % KCl | Mole % CuCl/KCl | Wt. % ZnO | Support | q |
|---|---|---|---|---|---|---|
| KG-I-113 | 43.5 | 5.77 | 85/15 | 0 | SiO$_2$ | 37 |
| KG-I-119 | 36.0 | 4.77 | 85/15 | 17.3 | SiO$_2$ | 37 |
| KG-I-117 | 30.7 | 4.07 | 85/15 | 29.4 | SiO$_2$ | 37 |
| KG-I-123 | 25.1 | 3.31 | 85/15 | 0 | Al$_2$O$_3$ | 31 |
| KG-I-131 | 36.5 | 12.9 | 68/32 | 0 | SiO$_2$ | 37 |
| AS-II-114-A | 29.9 | 10.6 | 68/32 | 18.2 | SiO$_2$ | 37 |

CATALYST KG-I-113

Before testing a ZnO-containing catalyst, a sample of porous silica was impregnated with a solution containing only the components of the molten salt mixture (CuCl/KCl) in order to determine if the molten salt itself exhibited any catalytic activity. Copper (I) chloride is insoluble in water; thus, it was necessary to use concentrated HCl as the solvent for loading the salt mixture onto the support. A solution of CuCl (4.29 g) and KCl (0.569 g), a mole percent ratio of 85:15, respectively, was prepared in concentrated HCl (7.3 mL). This salt concentration yields a 37 percent liquid loading (approximately a 30A liquid layer of salts) in the pores of the support. The dark green solution was transferred via pipet to the support. The mixture was shaken for several minutes to disperse the liquid. The solvent was then removed in vacuo with heating to 120° F., then to 230° F. Composition of the prepared catalyst (component, weight percent): CuCl, 43.5; KCl, 5.77. Other than drying in the reactor under a helium stream at elevated temperature, this catalyst required no further pretreatment before testing.

CATALYST KG-I-119

For the ZnO-containing catalysts, methanolic solutions of zinc nitrate were added to the support which had been previously impregnated with the eutectic components. Methanol was chosen as the impregnation solvent to minimize dissolution of KCl, which is sparingly soluble in methanol. In this case, the number of moles Zn(NO$_3$)$_2$ added was equivalent to one-half the sum of the moles of the eutectic components. A solution of Zn(NO$_3$)$_2$.6H$_2$O (2.54 g) in methanol (2.4 mL) was added to catalyst KG-I-113 (3.33 g) at room temperature. After drying under vacuum, the catalyst was placed in a crucible and heated to 660° F. overnight in a tube furnace to convert Zn(NO$_3$)$_2$ to a dispersion of ZnO microcrystallites. Nitrogen gas was passed over the samples during this pyrolysis step to inhibit air oxidation of the CuCl present in the catalyst mixture. Composition of the finished catalyst (component, weight percent): CuCl, 36.0; KCl, 4.77; ZnO, 17.3

CATALYST KG-I-117

Another ZnO-containing catalyst was prepared in a manner identical to that described for KG-I-119. The number of moles of zinc nitrate added was equivalent to the sum of moles of eutectic components. Composition of the finished catalyst (component, weight percent): CuCl, 30.7; KCl, 4.07; ZnO, 29.4.

CATALYST KG-I-123

This catalyst was prepared in a manner similar to that for KG-I-113, except that UCI T-2432 alumina support was used. Impregnation of the support with a solution containing CuCl and KCl in a 85:15 mole ratio produced, after drying in the usual manner, a 31 percent liquid loading of the molten salt. Composition of the final catalyst (component, weight percent): CuCl, 25.1; KCl, 3.31.

CATALYST K-I-131

In order to test a molten salt mixture with a lower melting point, a catalyst was prepared with CuCl and KCl in 68:32 mole ratio (mp=277° F.). A solution of CuCl and KCl was added to the silica support using the procedure described for catalyst KG-I-113. Composition of the final catalyst (component, weight percent): CuCl, 36.5; KCl, 12.9.

CATALYST AS-II-114-A

This catalyst was prepared from KG-I-131 in a manner identical to that used for catalyst KG-I-119. Composition of the final catalyst (component, weight percent): CuCl, 29.9; KCl, 10.6; ZnO, 18.2.

CATALYST UCI-L-1968

This catalyst is a $CuO/ZnO/Al_2O_3$ mixture of unknown proportions, and was used as received from United Catalysts, Inc. after pretreatment as described in Experiment 7.

METHANOL DEHYDROGENATION

Experimental Design

Supported catalysts were diluted prior to testing in order to minimize potential cold spots in the reactor caused by the endothermic dehydrogenation reaction. Cold spots are likely to occur in areas of high catalyst concentration, and may result in decreased conversion in these regions. Silicon carbide was chosen as the diluent because of its high thermal conductivity and inertness in the methanol dehydrogenation reaction. Only the volume of supported catalyst was used for the calculation of LHSV.

Reactions were typically carried out over several days with interruption of methanol flow for several hour periods during some experiments. Helium was passed through the reactor in the interim. Interruption of methanol flow did not deactivate or appreciably change the activity or selectivity of the catalysts tested. Reactor temperature was controlled, typically in the range of 660°–1200° F., during the experiments. The pressure in the reactor was varied in the range of 10–200 psi.

Experimental Results

Full experimental data are presented in the following tables and graphs.

Experiment 1.
Catalyst: KG-I-113, 2.2 mL; SiC, 2.8 mL
Catalyst pretreatment:
Dried under He flow, 2.5 hours at 77–500° F., then under $N_2$ flow for 24 hours, followed by He flow at 662° F. for 16 hours

| Time | LHSV | $T_o$ | $T_i$ | P | ΔP | CO | $CH_3OH$ | $Me_2O$ | $CH_4$ | $C_2H_6$ | $CO_2$ | S(CO) |
|---|---|---|---|---|---|---|---|---|---|---|---|---|
| 0.1 | 15.4 | 669 | 666 | 22 | 10 | 0.4 | 96 | 0.5 | 0.2 | 0 | 0.2 | 11 |
| 1.2 | 15.4 | 669 | 664 | 20 | 20 | 0.1 | 99.6 | 0 | 0.3 | 0 | 0 | 28 |
| 2.8 | 15.4 | 666 | 660 | 20 | 20 | 0.6 | 99.2 | 0 | 0.1 | 0 | 0 | 78 |
| 4.1 | 15.4 | 714 | 707 | 28 | 17 | 3.0 | 95.8 | 0 | 0.7 | 0 | 0.5 | 71 |
| 5.1 | 15.4 | 707 | 700 | 20 | 20 | 2.6 | 97 | 0 | 0.3 | 0 | 0 | 57 |
| 5.9 | 15.4 | 705 | 698 | 88 | 5 | 12 | 86.8 | 0 | 0.9 | 0 | 0 | 91 |
| 6.8 | 15.4 | 705 | 696 | 110 | 3 | 43 | 52.7 | 0.3 | 3.8 | 0 | 0 | 91 |
| 7.0 | 15.4 | 716 | 711 | 85 | 5 | 31 | 66 | 0.2 | 2.3 | 0 | 0.2 | 91 |
| 7.7 | 15.4 | 711 | 705 | 98 | 4 | 71.8 | 16 | 0.6 | 8.8 | 0.9 | 0.7 | 85 |
| 8.6 | 15.4 | 709 | 703 | 100 | 3 | 73 | 17 | 0.6 | 7.8 | 0.9 | 0.6 | 88 |
| 9.8 | 15.4 | 711 | 705 | 100 | 3 | 76 | 12 | 0.5 | 9.1 | 1.2 | 0.6 | 86 |
| 10.8 | 15.4 | 712 | 703 | 75 | 5 | 23 | 75 | 0 | 1.2 | 0 | 0 | 92 |
| 12.3 | 15.4 | 711 | 703 | 70 | 5 | 58 | 36 | 0.2 | 3.8 | 0.2 | 0.5 | 91 |
| 14.7 | 15.4 | 711 | 705 | 22 | 5 | 84.2 | 7.4 | 0.4 | 5.8 | 0.4 | 1.1 | 91 |
| 23.0 | 15.4 | 711 | 705 | 10 | 5 | 84 | 1.4 | 0.6 | 9.5 | 2.0 | 1.4 | 85 |
| 25.4 | 30.7 | 705 | 696 | 110 | 5 | 20 | 79 | 0 | 0.8 | 0 | 0.1 | 95 |
| 28.4 | 30.7 | 721 | 716 | 140 | 3 | 60 | 35 | 0.1 | 3.7 | 0.3 | 0.5 | 92 |
| 30.9 | 30.7 | 727 | 721 | 148 | 2 | 78 | 12 | 0.3 | 7.4 | 0.1 | 0.5 | 89 |
| 32.1 | 30.7 | 729 | 725 | 150 | 2 | 80 | 1.3 | 0.7 | 14 | 3.2 | 0.4 | 81 |
| 33.0 | 61.0 | 729 | 718 | 155 | 10 | 17 | 82 | 0 | 0.7 | 0 | 0.1 | 94 |
| 33.8 | 61.0 | 730 | 721 | 195 | 3 | 48 | 48 | 0.1 | 2.9 | 0.3 | 0.4 | 92 |
| 34.7 | 61.0 | 732 | 721 | 98 | 15 | 12 | 87 | 0 | 0.4 | 0 | 0 | 92 |
| 35.4 | 61.0 | 795 | 781 | 105 | 17 | 32 | 66 | 0 | 1.3 | 0 | 0.2 | 94 |
| 36.4 | 61.0 | 856 | 844 | 100 | 30 | 76 | 17 | 0.3 | 4.8 | 0.3 | 1.1 | 92 |
| 37.4 | 61.0 | 963 | 957 | 96 | 42 | 71 | 0 | 0.6 | 17 | 3.2 | 1.4 | 71 |
| 38.2 | 108 | 973 | 972 | 100 | 80 | 75 | 0 | 0.4 | 15 | 2.4 | 1.3 | 75 |
| 39.3 | 61.0 | 730 | 718 | 97 | 15 | 36 | 62 | 0 | 1.3 | 0 | 0.3 | 95 |

Units:
Time = h; flow = mL/minute; LHSV = liquid hourly space velocity = $h^{-1}$;
$T_{out}$ = bath temperature (°F.); $T_{in}$ = thermowell temperature (°F.); P = pressure (psi); ΔP = pressure drop across the reactor; S(CO) = selectivity to CO.

Experiment 2.
Catalyst: KG-I-119, 1.6 mL; SiC, 3.5 mL.
Catalyst pretreatment:
Dried under He flow, 28 hours at 77–680° F., 90 psi at 15–20 mL/minute.

| Time | LHSV | $T_o$ | $T_i$ | P | ΔP | CO | CH₃OH | Me₂O | CH₄ | HCO₂CH₃ | S(CO) |
|---|---|---|---|---|---|---|---|---|---|---|---|
| 0.2 | 44 | 680 | 671 | 80 | 5 | 39.3 | 39.0 | 8.9 | 10.3 | 0 | 64 |
| 1.2 | 44 | 675 | 666 | 85 | 5 | 26.2 | 71.3 | 0.6 | 1.5 | 0 | 91 |
| 2.5 | 44 | 702 | 693 | 92 | 3 | 65.7 | 2.6 | 1.5 | 22.9 | 0.9 | 67 |
| 3.6 | 66 | 754 | 743 | 102 | 10 | 36.3 | 61.1 | 0.1 | 1.8 | 0.1 | 93 |
| 4.8 | 66 | 757 | 748 | 122 | 5 | 85 | 5.5 | 0 | 7.7 | 0.2 | 90 |
| 5.8 | 66 | 752 | 739 | 68 | 19 | 29 | 70 | 0 | 0.8 | 0.7 | 97 |
| 13.1 | 66 | 739 | 730 | 90 | 7 | 24 | 75 | 0 | 0.9 | 0 | 96 |
| 14.2 | 66 | 752 | 743 | 115 | 3 | 68 | 1.6 | 1.7 | 22 | 0.8 | 69 |
| 15.3 | 110 | 757 | 747 | 102 | 18 | 16 | 84 | 0 | 0.6 | 0 | >99 |
| 16.8 | 110 | 759 | 750 | 112 | 15 | 21 | 78 | 0 | 0.8 | 0 | 95 |
| 18.0 | 110 | 757 | 748 | 140 | 5 | 45 | 52 | 0 | 2.3 | 0 | 94 |
| 19.1 | 110 | 756 | 747 | 155 | 2 | 45 | 3.8 | 3.9 | 37 | 1.4 | 47 |
| 20.3 | 110 | 784 | 795 | 80 | 22 | 17 | 82 | 0 | 0.7 | 0 | 94 |
| 22.5 | 110 | 795 | 784 | 75 | 15 | 21 | 78 | 0 | 0.7 | 0 | 95 |
| 23.7 | 110 | 802 | 793 | 115 | 12 | 46 | 52 | 0 | 2.2 | 0 | 96 |
| 24.8 | 110 | 808 | 799 | 145 | 2 | 57 | 2.5 | 3.1 | 30 | 1.0 | 58 |
| 25.9 | 110 | 858 | 847 | 80 | 25 | 50 | 48 | 0 | 2.3 | 0 | 96 |
| 27.3 | 110 | 869 | 860 | 100 | 18 | 62 | 34 | 0 | 3.3 | 0 | 94 |
| 28.3 | 110 | 874 | 862 | 135 | 3 | 84.5 | 0 | 1.3 | 12 | 0 | 84 |
| 29.4 | 110 | 930 | 919 | 45 | 43 | 79 | 16 | 0 | 4 | 0 | 94 |
| 30.4 | 110 | 932 | 923 | 80 | 30 | 90.2 | 0 | 0 | 5.9 | 0 | 90 |
| 31.2 | 198 | 943 | 928 | 79 | 60 | 68 | 26.4 | 0.7 | 3.5 | 0 | 92 |
| 32.1 | 198 | 937 | 923 | 117 | 38 | 74.4 | 19.8 | 0.7 | 4.1 | 0 | 93 |
| 41.0 | 66 | 772 | 763 | 90 | 2 | 58 | 10.1 | 5.1 | 20.6 | 0 | 64 |

Units:
Time = h; flow = mL/minute; LHSV = liquid hourly space velocity = h⁻¹; $T_{out}$ = bath temperature (°F.); $T_{in}$ = thermowell temperature (°F.); P = pressure (psi); ΔP = pressure drop across the reactor; S(CO) = selectivity to CO.

Experiment 3.
Catalyst: KG-I-117, 1.1 mL; SiC, 4.1 mL.
Catalyst pretreatment:
Dried under He flow, 21 hours at 77–680° F., 90 psi at 60 mL/minute.

| Time | LHSV | $T_o$ | $T_i$ | P | ΔP | CO | CH₃OH | Me₂O | CH₄ | C₂H₆ | CO₂ | S(CO) |
|---|---|---|---|---|---|---|---|---|---|---|---|---|
| 0.1 | 61 | 666 | 660 | 20 | 22 | 0.5 | 98.5 | 0.2 | 0.1 | 0 | 0 | 32 |
| 1.3 | 61 | 662 | 653 | 20 | 22 | 3.1 | 91.2 | 0.2 | 0 | 0 | 0 | 35 |
| 2.4 | 61 | 664 | 655 | 50 | 9 | 14.5 | 80.8 | 0.5 | 0.2 | 0.2 | 0 | 76 |
| 3.2 | 61 | 666 | 658 | 70 | 2 | 74 | 1.0 | 2.6 | 13 | 2.8 | 0 | 75 |
| 4.5 | 61 | 711 | 702 | 20 | 25 | 15 | 82 | 0 | 0.2 | 0.1 | 0 | 83 |
| 5.6 | 61 | 711 | 702 | 48 | 15 | 38 | 60 | 0.9 | 0.6 | 0 | 0 | 95 |
| 6.6 | 61 | 711 | 703 | 69 | 2 | 77 | 1.1 | 3.0 | 15 | 3.0 | 0.9 | 78 |
| 7.5 | 121 | 711 | 702 | 20 | 45 | 6.4 | 92.4 | 0 | 0.1 | 0 | 0 | 84 |
| 12.3 | 121 | 720 | 709 | 62 | 20 | 13.1 | 86 | 0 | 0.3 | 0.1 | 0 | 94 |
| 13.2 | 121 | 716 | 707 | 20 | 45 | 6.3 | 93.1 | 0 | 0.2 | 0 | 0 | 91 |
| 14.2 | 121 | 712 | 705 | 105 | 3 | 73.9 | 20 | 0 | 4.8 | 0.4 | 0 | 92 |
| 15.7 | 121 | 714 | 705 | 88 | 5 | 21.4 | 77.8 | 0 | 0.5 | 0 | 0 | 96 |
| 16.0 | 121 | 750 | 739 | 20 | 40 | 9.5 | 90.1 | 0.2 | 0.2 | 0 | 0 | 96 |
| 17.6 | 121 | 752 | 741 | 45 | 25 | 13.6 | 85.3 | 0.2 | 0.3 | 0 | 0 | 93 |
| 19.0 | 121 | 750 | 741 | 82 | 8 | 36.3 | 62.2 | 0.4 | 1.0 | 0 | 0 | 96 |
| 19.4 | 121 | 752 | 743 | 100 | 3 | 33.0 | 0 | 9.2 | 38.8 | 7.4 | 0 | 33 |
| 21.2 | 121 | 822 | 811 | 20 | 45 | 27.9 | 70.0 | 0.9 | 0.8 | 0 | 0 | 93 |
| 22.3 | 121 | 824 | 811 | 53 | 22 | 45.7 | 52.3 | 0.3 | 1.4 | 0.2 | 0 | 96 |
| 23.2 | 121 | 826 | 817 | 82 | 10 | 86.5 | 6.8 | 0.9 | 4.2 | 0.2 | 0 | 93 |
| 24.5 | 121 | 887 | 873 | 20 | 50 | 61.8 | 35.2 | 0.7 | 2.1 | 0 | 0 | 95 |
| 25.5 | 121 | 892 | 882 | 55 | 25 | 86.4 | 7.9 | 0.8 | 3.9 | 0.2 | 0 | 94 |
| 26.0 | 121 | 894 | 883 | 20 | 55 | 64.2 | 28.5 | 0.6 | 0.2 | 0 | 5.1 | 90 |
| 27.7 | 121 | 934 | 921 | 20 | 60 | 88 | 6.4 | 0.9 | 3.6 | 0.3 | 0.7 | 94 |
| 28.8 | 303 | 932 | 736 | 21 | 124 | 63.2 | 33.1 | 0.6 | 2.5 | 0.1 | 0.5 | 95 |
| 29.8 | 303 | 937 | 921 | 48 | 122 | 69.0 | 26.6 | 0.8 | 2.9 | 0.1 | 0.5 | 94 |
| 31.2 | 303 | 939 | 925 | 70 | 90 | 74.7 | 20.4 | 0.8 | 3.3 | 0.2 | 0.6 | 94 |
| 33.1 | 303 | 939 | 927 | 78 | 87 | 78.3 | 16.3 | 0.9 | 3.7 | 0.2 | 0.6 | 94 |
| 33.9 | 303 | 930 | 918 | 95 | 75 | 78.0 | 16.4 | 1.1 | 3.7 | 0.2 | 0.2 | 93 |
| 36.1 | 303 | 934 | 921 | 135 | 45 | 85.7 | 6.8 | 1.1 | 5.3 | 0.3 | 0.9 | 92 |
| 37.6 | 303 | 981 | 970 | 20 | 145 | 89.9 | 0 | 0.9 | 6.5 | 0.4 | 0.7 | 90 |
| 38.8 | 303 | 981 | 970 | 20 | 145 | 89.8 | 0 | 1.0 | 7.3 | 0.6 | 0.5 | 90 |
| 39.6 | 303 | 982 | 972 | 20 | 150 | 89.4 | 0 | 1.1 | 8.2 | 0.7 | 0.6 | 89 |
| 50.1 | 121 | 754 | 745 | 20 | 55 | 22.6 | 76.5 | 0 | 0.7 | 0 | 0 | 96 |
| 52.1 | 121 | 756 | 747 | 55 | 23 | 45.0 | 52.9 | 0 | 1.7 | 0.2 | 0.2 | 96 |
| 52.9 | 121 | 754 | 747 | 80 | 5 | 81.3 | 0.8 | 2.9 | 12.5 | 1.6 | 1.0 | 82 |

-continued

Experiment 3.
Catalyst: KG-I-117, 1.1 mL; SiC, 4.1 mL.
Catalyst pretreatment:
Dried under He flow, 21 hours at 77–680° F., 90
psi at 60 mL/minute.

| Time | LHSV | $T_o$ | $T_i$ | P | ΔP | CO | $CH_3OH$ | $Me_2O$ | $CH_4$ | $C_2H_6$ | $CO_2$ | S(CO) |
|---|---|---|---|---|---|---|---|---|---|---|---|---|
| 54.0 | 121 | 707 | 698 | 20 | 53 | 10.4 | 89.3 | 0 | 0.3 | 0.1 | 0 | 97 |
| 56.2 | 121 | 712 | 705 | 80 | 3 | 74.2 | 1.1 | 4.8 | 16.5 | 2.3 | 1.0 | 75 |
| 58.4 | 121 | 712 | 703 | 59 | 19 | 26.4 | 72.6 | 0 | 0.8 | 0 | 0.1 | 96 |

Units:
Time = h; flow = mL/minute; LHSV = liquid hourly space velocity = $h^{-1}$; $T_{out}$ = bath temperature (°F.); $T_{in}$ = thermowell temperature (°F.); P = pressure (psi); ΔP = pressure drop across the reactor; S(CO) = selectivity to CO.

Experiment 4.
Catalyst: KG-I-123, 1.3 mL; SiC, 3.8 mL
Catalyst pretreatment:
Dried under He flow, 23 hours at 77–680° F., 90
psi at 40 mL/minute.

| Time | LHSV | $T_o$ | $T_i$ | P | ΔP | CO | $CH_3OH$ | $Me_2O$ | $CH_4$ | $C_2H_6$ | $CO_2$ | S(CO) |
|---|---|---|---|---|---|---|---|---|---|---|---|---|
| 0.4 | 52 | 667 | 660 | 30 | 15 | 6.3 | 91.7 | 1.2 | 0.3 | 0 | 0 | 76 |
| 1.4 | 52 | 667 | 662 | 49 | 3 | 35.1 | 48.5 | 13.4 | 2.6 | 0 | 0.4 | 68 |
| 2.3 | 104 | 666 | 658 | 20 | 40 | 1.1 | 98.2 | 0.2 | 0.1 | 0.1 | 0 | 63 |
| 3.6 | 104 | 666 | 658 | 60 | 10 | 4.9 | 93.4 | 1.3 | 0.2 | 0.1 | 0 | 75 |
| 4.5 | 104 | 664 | 658 | 75 | 3 | 72.1 | 10.3 | 12.0 | 5.3 | 0.4 | 0 | 80 |
| 5.4 | 104 | 703 | 698 | 20 | 40 | 2.4 | 96.9 | 0.5 | 0.2 | 0.1 | 0 | 76 |
| 6.7 | 104 | 709 | 703 | 65 | 10 | 19.1 | 74.3 | 5.3 | 1.0 | 0 | 0.2 | 74 |
| 9.8 | 104 | 705 | 698 | 78 | 2 | 75.5 | 11.9 | 7.4 | 4.4 | 0.4 | 0.3 | 86 |
| 10.2 | 104 | 748 | 743 | 20 | 40 | 5.4 | 92.8 | 1.4 | 0.3 | 0.1 | 0 | 75 |
| 11.1 | 104 | 750 | 745 | 49 | 29 | 15.0 | 81.6 | 2.7 | 0.7 | 0 | 0 | 82 |
| 12.3 | 104 | 754 | 748 | 73 | 5 | 82.0 | 0.8 | 2.5 | 12.8 | 1.8 | 0.1 | 83 |
| 13.2 | 104 | 804 | 797 | 20 | 42 | 19.3 | 77.1 | 2.6 | 0.9 | 0 | 0 | 84 |
| 15.0 | 104 | 808 | 801 | 45 | 23 | 36.7 | 56.9 | 4.7 | 1.5 | 0 | 0.2 | 85 |
| 15.9 | 104 | 804 | 797 | 65 | 9 | 81.7 | 8.9 | 4.7 | 4.1 | 0.2 | 0.5 | 90 |
| 20.0 | 104 | 853 | 844 | 10 | 43 | 44.3 | 50.5 | 3.4 | 1.6 | 0.1 | 0.2 | 90 |
| 21.0 | 104 | 846 | 837 | 22 | 43 | 48.5 | 46.1 | 3.5 | 1.7 | 0 | 0.2 | 90 |
| 22.2 | 104 | 860 | 851 | 40 | 29 | 74.9 | 17.8 | 3.8 | 3.0 | 0.1 | 0.4 | 91 |
| 23.3 | 104 | 853 | 844 | 64 | 11 | 90.3 | 0 | 1.4 | 6.9 | 0.8 | 0.7 | 90 |
| 26.9 | 104 | 860 | 851 | 38 | 29 | 71.0 | 22.0 | 3.8 | 2.7 | 0.1 | 0.4 | 91 |
| 34.8 | 104 | 846 | 837 | 39 | 30 | 70.6 | 23.0 | 3.3 | 2.6 | 0.1 | 0.5 | 92 |
| 35.9 | 104 | 882 | 873 | 10 | 57 | 75.1 | 19.1 | 2.8 | 2.6 | 0.1 | 0.5 | 93 |
| 36.9 | 104 | 889 | 880 | 20 | 48 | 84.7 | 9.1 | 2.4 | 3.2 | 0.1 | 0.5 | 93 |
| 37.8 | 104 | 878 | 851 | 20 | 48 | 84.8 | 9.1 | 2.4 | 3.2 | 0.1 | 0.5 | 93 |
| 39.2 | 104 | 891 | 882 | 30 | 39 | 91.0 | 2.6 | 1.9 | 3.8 | 0.2 | 0.6 | 93 |
| 40.3 | 208 | 889 | 880 | 15 | 100 | 58.2 | 37.4 | 2.1 | 1.9 | 0.1 | 0.3 | 93 |
| 45.1 | 208 | 883 | 873 | 19 | 86 | 62.2 | 33.8 | 1.8 | 1.9 | 0 | 0.3 | 94 |
| 46.0 | 208 | 885 | 873 | 32 | 86 | 68.2 | 27.2 | 1.9 | 2.3 | 0.1 | 0.4 | 94 |
| 46.9 | 208 | 889 | 876 | 47 | 73 | 74.4 | 20.4 | 1.9 | 2.6 | 0.1 | 0.6 | 94 |
| 57.7 | 208 | 894 | 882 | 50 | 75 | 89.1 | 4.9 | 1.4 | 3.8 | 0.2 | 0.6 | 94 |
| 59.2 | 208 | 883 | 871 | 35 | 89 | 84.5 | 10.3 | 1.3 | 3.1 | 0.1 | 0.6 | 94 |
| 62.1 | 208 | 921 | 910 | 12 | 111 | 93.5 | 0 | 1.2 | 4.5 | 0.2 | 0.7 | 94 |
| 63.8 | 208 | 923 | 914 | 30 | 95 | 91.4 | 0 | 1.2 | 5.9 | 0.5 | 0.9 | 91 |
| 64.7 | 208 | 925 | 918 | 60 | 68 | 87.3 | 0 | 1.2 | 9.3 | 0.9 | 1.3 | 87 |
| 67.0 | 260 | 930 | 921 | 10 | 150 | 91.6 | 0 | 1.2 | 6.0 | 0.3 | 0.8 | 92 |
| 69.5 | 260 | 981 | 975 | 18 | 152 | 77.4 | 0 | 1.6 | 16.8 | 1.4 | 0.4 | 77 |
| 70.9 | 260 | 982 | 975 | 20 | 150 | 69.9 | 0.6 | 1.5 | 23.4 | 2.2 | 0.1 | 70 |
| 71.9 | 260 | 939 | 930 | 8 | 165 | 78.6 | 0.6 | 1.4 | 17.4 | 1.9 | 0.1 | 79 |
| 72.9 | 234 | 923 | 914 | 20 | 300+ | 84.8 | 0.4 | 1.0 | 12.1 | 1.2 | 0.4 | 85 |

Units:
Time = h; flow = mL/minute; LHSV = liquid hourly space velocity = $h^{-1}$; $T_{out}$ = bath temperature (°F.); $T_{in}$ = thermowell temperature (°F.); P = pressure (psi); ΔP = pressure drop across the reactor; S(CO) = selectivity to CO.

Experiment 5.
Catalyst: KG-I-131, 1.1 mL; SiC, 3.8 mL
Catalyst pretreatment:
Dried under He flow, 12 hours at 77–680° F., 90
psi at 50 mL/minute.

| Time | LHSV | $T_o$ | $T_i$ | P | ΔP | CO | $CH_3OH$ | $Me_2O$ | $CH_4$ | $C_2H_6$ | $CO_2$ | S(CO) |
|---|---|---|---|---|---|---|---|---|---|---|---|---|
| 0.4 | 98.2 | 671 | 669 | 40 | 5 | 0.3 | 98.6 | 0 | 0.3 | 0.1 | 0 | 21 |
| 1.7 | 98.2 | 671 | 667 | 30 | 7 | 0 | 99.8 | 0 | 0.1 | 0.1 | 0 | 0 |
| 2.7 | 98.2 | 667 | 666 | 49 | 4 | 1.0 | 97.7 | 0 | 0.5 | 0.1 | 0 | 58 |
| 4.0 | 98.2 | 707 | 702 | 35 | 8 | 0.1 | 99.3 | 0 | 0.2 | 0.1 | 0 | 16 |

-continued
Experiment 5.
Catalyst: KG-I-131, 1.1 mL; SiC, 3.8 mL
Catalyst pretreatment:
Dried under He flow, 12 hours at 77-680° F., 90
psi at 50 mL/minute.

| | | | | | | Weight Percent Component | | | | | | |
|---|---|---|---|---|---|---|---|---|---|---|---|---|
| Time | LHSV | $T_o$ | $T_i$ | P | $\Delta P$ | CO | CH$_3$OH | Me$_2$O | CH$_4$ | C$_2$H$_6$ | CO$_2$ | S(CO) |
| 5.1 | 99.2 | 746 | 741 | 22 | 12 | 0.1 | 99.7 | 0 | 0.2 | 0 | 0 | 59 |
| 8.1 | 98.2 | 754 | 750 | 59 | 14 | 14.7 | 73.1 | 2.8 | 8.5 | 0 | 0 | 55 |
| 9.3 | 98.2 | 808 | 802 | 50 | 3 | 3.6 | 94.1 | 0.1 | 1.4 | 0 | 0 | 61 |
| 10.3 | 98.2 | 810 | 806 | 33 | 8 | 1.0 | 98.1 | 0 | 0.5 | 0.1 | 0 | 52 |
| 11.4 | 32.6 | 817 | 811 | 25 | 3 | 2.6 | 95.8 | 0 | 0.8 | 0.1 | 0 | 62 |
| 12.5 | 32.6 | 876 | 871 | 27 | 3 | 31.0 | 58.0 | 2.0 | 7.2 | 0.3 | 0.2 | 74 |
| 22.2 | 32.6 | 964 | 957 | 28 | 3 | 88.9 | 0 | 0 | 9.9 | 1.0 | 0.2 | 89 |
| 25.7 | 326 | 934 | 910 | 24 | 71 | 46.6 | 51.4 | 0 | 1.3 | 0 | 0.3 | 96 |
| 26.6 | 326 | 936 | 912 | 34 | 76 | 56.8 | 40.6 | 0 | 1.8 | 0.1 | 0.4 | 96 |
| 27.5 | 326 | 939 | 921 | 30 | 93 | 66.6 | 30.1 | 0 | 2.3 | 0.1 | 0.5 | 95 |
| 28.8 | 326 | 937 | 923 | 23 | 116 | 79.4 | 15.5 | 0 | 3.5 | 0.2 | 0.8 | 94 |
| 29.5 | 326 | 943 | 927 | 32 | 118 | 90.8 | 2.9 | 0 | 5.9 | 0.4 | 0 | 94 |
| 32.4 | 326 | 950 | 945 | 15 | 148 | 85.8 | 0 | 0 | 11.3 | 0.8 | 1.3 | 86 |
| 32.4 | 326 | 892 | 885 | 59 | 111 | 88.6 | 0 | 0 | 9.5 | 0.9 | 1.0 | 89 |
| 34.6 | 326 | 883 | 876 | 10 | 156 | 91.7 | 0 | 0 | 6.6 | 0.5 | 1.1 | 92 |
| 36.1 | 326 | 779 | 770 | 20 | 143 | 56.8 | 41.1 | 0 | 1.7 | 0.1 | 0.4 | 96 |
| 37.2 | 326 | 779 | 772 | 20 | 143 | 50.9 | 47.4 | 0 | 1.6 | 0 | 0 | 97 |
| 47.8 | 326 | 770 | 766 | 20 | 145 | 50.1 | 48.1 | 0 | 1.4 | 0 | 0.4 | 97 |
| 50.8 | 326 | 770 | 766 | 27 | 135 | 49.4 | 48.9 | 0 | 1.4 | 0 | 0.3 | 97 |
| 51.9 | 326 | 770 | 766 | 43 | 123 | 54.9 | 43.0 | 0 | 1.6 | 0 | 0.4 | 96 |
| 69.2 | 326 | 775 | 775 | 40 | 125 | 80.8 | 16.0 | 0 | 2.4 | 0.1 | 0.8 | 96 |
| 70.4 | 326 | 772 | 768 | 56 | 107 | 82.4 | 13.7 | 0 | 2.7 | 0.2 | 0.9 | 96 |
| 71.4 | 326 | 770 | 766 | 20 | 138 | 75.2 | 21.5 | 0 | 2.6 | 0.3 | 0.6 | 96 |
| 72.3 | 326 | 770 | 766 | 69 | 88 | 88.0 | 6.0 | 0 | 4.2 | 0.4 | 1.3 | 94 |
| 73.6 | 326 | 768 | 765 | 88 | 73 | 86.2 | 8.5 | 0 | 3.6 | 0.4 | 1.3 | 94 |
| 75.5 | 326 | 754 | 750 | 33 | 115 | 69.2 | 28.3 | 0 | 1.9 | 0.1 | 0.4 | 96 |
| 76.5 | 326 | 765 | 761 | 39 | 119 | 80.2 | 16.3 | 0 | 2.6 | 0.2 | 0.7 | 96 |
| 78.0 | 326 | 687 | 682 | 26 | 119 | 26.3 | 73.2 | 0 | 0.5 | 0 | 0 | 98 |
| 79.1 | 326 | 689 | 685 | 38 | 120 | 28.2 | 71.2 | 0 | 0.5 | 0 | 0 | 98 |
| 105.9 | 326 | 689 | 685 | 59 | 100 | 34.4 | 64.7 | 0 | 0.7 | 0 | 0.2 | 97 |
| 107.1 | 326 | 689 | 685 | 39 | 114 | 31.5 | 67.8 | 0 | 0.5 | 0.1 | 0 | 98 |
| 116.6 | 326 | 689 | 685 | 35 | 114 | 34.8 | 64.2 | 0 | 0.6 | 0.1 | 0.2 | 97 |
| 117.7 | 326 | 685 | 684 | 10 | 133 | 31.7 | 67.4 | 0 | 0.6 | 0.1 | 0.1 | 97 |
| 118.6 | 326 | 685 | 684 | 30 | 118 | 32.6 | 66.9 | 0 | 0.5 | 0 | 0 | 98 |
| 119.5 | 326 | 685 | 682 | 47 | 112 | 35.9 | 63.4 | 0 | 0.7 | 0 | 0 | 98 |
| 120.8 | 326 | 685 | 682 | 70 | 80 | 38.4 | 60.8 | 0 | 0.6 | 0 | 0.2 | 98 |
| 121.9 | 326 | 689 | 685 | 93 | 65 | 52.0 | 46.4 | 0 | 1.3 | 0 | 0.4 | 97 |
| 123.1 | 326 | 691 | 687 | 122 | 26 | 76.1 | 19.4 | 0 | 3.3 | 0.3 | 0.9 | 94 |
| 124.3 | 326 | 691 | 687 | 135 | 22 | 81.2 | 12.7 | 0 | 4.6 | 0.6 | 0.9 | 93 |
| 127.0 | 326 | 756 | 752 | 10 | 142 | 78.7 | 17.7 | 0 | 2.8 | 0.1 | 0.8 | 96 |
| 128.1 | 326 | 752 | 748 | 22 | 129 | 81.5 | 14.6 | 0 | 2.9 | 0.2 | 0.8 | 95 |
| 129.0 | 326 | 752 | 748 | 32 | 143 | 74.0 | 23.6 | 0 | 1.8 | 0.1 | 0.5 | 97 |
| 129.9 | 326 | 718 | 714 | 10 | 140 | 55.4 | 43.3 | 0 | 1.1 | 0 | 0.3 | 98 |
| 131.0 | 326 | 721 | 718 | 20 | 130 | 61.8 | 36.2 | 0 | 1.4 | 0.2 | 0.4 | 97 |
| 132.1 | 326 | 716 | 712 | 41 | 137 | 53.3 | 45.4 | 0 | 1.0 | 0 | 0.3 | 98 |
| 146.1 | 293 | 716 | 712 | 20 | 300+ | 34.4 | 64.9 | 0 | 0.7 | 0 | 0.1 | 98 |
| 147.0 | 293 | 720 | 716 | 36 | 300+ | 34.3 | 64.8 | 0 | 0.8 | 0 | 0.1 | 97 |
| 147.9 | 293 | 716 | 712 | 63 | 300+ | 35.8 | 63.2 | 0 | 0.8 | 0 | 0.2 | 97 |
| 148.8 | 293 | 716 | 712 | 88 | 200+ | 37.0 | 61.9 | 0 | 0.9 | 0 | 0.2 | 97 |
| 151.7 | 293 | 720 | 718 | 170 | 200+ | 49.5 | 48.5 | 0 | 1.6 | 0.1 | 0.4 | 96 |
| 152.7 | 293 | 797 | 793 | 10 | 300+ | 81.4 | 14.4 | 0 | 3.2 | 0.2 | 0.7 | 95 |
| 153.6 | 293 | 797 | 793 | 30 | 300+ | 85.8 | 8.4 | 0 | 4.6 | 0.3 | 1.0 | 94 |
| 154.5 | 293 | 797 | 793 | 20 | 300+ | 87.5 | 6.1 | 0 | 5.0 | 0.4 | 1.0 | 93 |
| 155.8 | 293 | 797 | 793 | 43 | 300+ | 88.9 | 4.0 | 0 | 5.4 | 0.5 | 1.3 | 93 |
| 157.1 | 293 | 752 | 747 | 10 | 300+ | 70.2 | 26.7 | 0 | 2.3 | 0.3 | 0.5 | 96 |
| 158.0 | 293 | 752 | 748 | 38 | 300+ | 71.0 | 21.7 | 0 | 1.6 | 0 | 5.6 | 91 |
| 158.6 | 293 | 750 | 747 | 65 | 300+ | 74.8 | 15.0 | 0 | 2.0 | 0.4 | 7.8 | 88 |
| 159.6 | 293 | 752 | 748 | 85 | 300+ | 77.0 | 10.1 | 0 | 2.5 | 1.4 | 10.0 | 86 |

Units:
Time = h; flow = mL/minute; LHSV = liquid hourly space velocity = $h^{-1}$; $T_{out}$ = bath temperature (°F.); $T_{in}$ = thermowell temperature (°F.); P = pressure (psi); $\Delta P$ = pressure drop across the reactor; S(CO) = selectivity to CO.

Experiment 6.
Catalyst: AS-II-114-A, 0.73 mL; SiC, 4.4 mL.
Catalyst pretreatment:
Dried under He flow, 23 hours at 77-662° C.

| | | | | | | Weight Percent Component | | | | | | |
|---|---|---|---|---|---|---|---|---|---|---|---|---|
| Time | LHSV | $T_o$ | $T_i$ | P | $\Delta P$ | CO | CH$_3$OH | Me$_2$O | CH$_4$ | HCO$_2$CH$_3$ | CO$_2$ | S(CO) |
| 0.1 | 288 | 662 | 662 | 20 | 30 | 0 | 98.1 | 0 | 0 | 1.4 | 0.1 | 0 |
| 1.1 | 288 | 658 | 658 | 65 | 14 | 1.7 | 97.4 | 0 | 0 | 0.3 | 0.6 | 65 |
| 2.0 | 288 | 664 | 664 | 117 | 5 | 19.0 | 75.7 | 1.8 | 0.3 | 0.7 | 5.5 | 78 |

-continued

Experiment 6.
Catalyst: AS-II-114-A, 0.73 mL; SiC, 4.4 mL.
Catalyst pretreatment:
Dried under He flow, 23 hours at 77–662° C.

| Time | LHSV | $T_o$ | $T_i$ | P | ΔP | CO | CH₃OH | Me₂O | CH₄ | HCO₂CH₃ | CO₂ | S(CO) |
|---|---|---|---|---|---|---|---|---|---|---|---|---|
| 2.9 | 288 | 748 | 748 | 20 | 33 | 1.6 | 97.8 | 0 | 0 | 0.1 | 0.4 | 74 |
| 7.1 | 288 | 757 | 757 | 20 | 33 | 1.3 | 97.9 | 0 | 0.1 | 0.4 | 0.4 | 63 |
| 7.9 | 288 | 752 | 747 | 93 | 5 | 15.4 | 80.5 | 0.2 | 0.6 | 0.2 | 3.1 | 79 |
| 8.8 | 288 | 752 | 748 | 106 | 6 | 24.9 | 66.6 | 1.0 | 1.1 | 0 | 6.3 | 75 |
| 9.7 | 288 | 748 | 745 | 44 | 20 | 2.0 | 97.4 | 0 | 0.1 | 0.2 | 0.4 | 75 |
| 10.8 | 288 | 756 | 752 | 63 | 15 | 3.1 | 96.1 | 0 | 0.1 | 0.2 | 0.6 | 78 |
| 11.8 | 288 | 847 | 840 | 19 | 35 | 6.2 | 90.9 | 0.9 | 0.3 | 0 | 1.8 | 68 |
| 21.8 | 288 | 838 | 833 | 19 | 34 | 10.0 | 87.3 | 0 | 0.2 | 0.7 | 1.7 | 79 |
| 22.8 | 288 | 840 | 833 | 49 | 28 | 20.0 | 75.8 | 0.1 | 0.4 | 0.7 | 3.0 | 83 |
| 23.8 | 288 | 842 | 837 | 84 | 13 | 41.6 | 51.0 | 0.4 | 0.8 | 0 | 6.1 | 85 |
| 24.7 | 288 | 847 | 842 | 101 | 8 | 59.8 | 28.6 | 0.6 | 1.7 | 0 | 8.9 | 84 |
| 25.4 | 288 | 846 | 846 | 110 | 5 | 37.9 | 1.9 | 2.6 | 12.6 | 0 | 34.3 | 39 |
| 29.8 | 288 | 882 | 876 | 18 | 56 | 16.3 | 81.1 | 0 | 0.4 | 0.2 | 2.0 | 86 |
| 30.5 | 288 | 882 | 876 | 48 | 34 | 25.5 | 70.5 | 0.2 | 0.5 | 0.2 | 3.1 | 86 |
| 31.5 | 288 | 891 | 887 | 73 | 20 | 42.6 | 51.4 | 0.4 | 0.9 | 0 | 4.6 | 88 |
| 32.3 | 288 | 887 | 883 | 93 | 12 | 65.2 | 24.9 | 0.5 | 1.8 | 0 | 7.3 | 87 |
| 33.0 | 288 | 885 | 883 | 108 | 6 | 59.1 | 1.2 | 1.2 | 10.5 | 0 | 20.2 | 59 |
| 33.8 | 288 | 941 | 936 | 15 | 65 | 40.2 | 53.7 | 0.4 | 1.1 | 0.1 | 4.3 | 87 |
| 34.7 | 288 | 936 | 930 | 29 | 54 | 42.7 | 51.3 | 0.4 | 1.1 | 0.1 | 4.3 | 88 |
| 35.4 | 288 | 934 | 928 | 42 | 45 | 47.1 | 46.2 | 0.4 | 1.2 | 0.1 | 4.6 | 88 |
| 36.0 | 288 | 937 | 934 | 60 | 35 | 56.1 | 36.3 | 0.4 | 1.6 | 0 | 5.5 | 88 |
| 36.8 | 288 | 943 | 939 | 82 | 21 | 76.6 | 10.6 | 1.0 | 3.1 | 0 | 8.2 | 86 |
| 44.2 | 288 | 937 | 934 | 48 | 49 | 74.9 | 13.9 | 1.0 | 2.7 | 0 | 5.3 | 87 |
| 45.9 | 288 | 986 | 984 | 11 | 85 | 87.6 | 0 | 0 | 4.4 | 0 | 8.0 | 88 |
| 47.7 | 288 | 756 | 752 | 10 | 77 | 14.9 | 84.2 | 0 | 0.2 | 0.2 | 0.6 | 94 |
| 48.6 | 288 | 752 | 748 | 30 | 57 | 17.2 | 81.5 | 0 | 0.2 | 0.2 | 0.9 | 93 |
| 49.3 | 288 | 752 | 748 | 47 | 43 | 19.4 | 79.1 | 0 | 0.2 | 0.1 | 1.2 | 93 |
| 50.1 | 288 | 756 | 752 | 73 | 25 | 29.4 | 68.3 | 0 | 0.4 | 0.1 | 1.9 | 93 |
| 50.9 | 288 | 757 | 754 | 93 | 10 | 59.7 | 34.0 | 0.2 | 1.1 | 0 | 4.9 | 90 |
| 53.8 | 288 | 759 | 757 | 104 | 3 | 73.2 | 14.4 | 1.4 | 2.0 | 0 | 8.6 | 86 |
| 54.7 | 288 | 752 | 748 | 83 | 15 | 44.0 | 52.8 | 0 | 0.6 | 0 | 2.6 | 93 |
| 55.6 | 288 | 847 | 844 | 11 | 78 | 50.1 | 46.1 | 0.1 | 0.8 | 0 | 2.8 | 93 |
| 56.3 | 288 | 846 | 842 | 28 | 59 | 54.4 | 41.5 | 0.2 | 0.9 | 0 | 2.9 | 93 |
| 59.1 | 288 | 840 | 837 | 62 | 35 | 65.8 | 27.2 | 0.2 | 1.5 | 0 | 4.2 | 90 |
| 59.8 | 288 | 849 | 846 | 80 | 20 | 80.5 | 4.0 | 0.8 | 3.2 | 0 | 10.6 | 84 |

Units:
Time = h; flow = mL/minute; LHSV = liquid hourly space velocity = $h^{-1}$; $T_{out}$ = bath temperature (°F.); $T_{in}$ = thermowell temperature (°F.); P = pressure (psi); ΔP = pressure drop across the reactor; S(CO) = selectivity to CO.

Experiment 7.
Catalyst: UCI #L-1968, 0.74 mL; SiC, 4.5 mL.
Catalyst pretreatment:
Dried under He flow, 12 hours at 212–572° F., 90
psi at 80 mL/minute.
Reduced under flow of 4.1% H₂/N₂, 9 hours at
482° F., 20 psi at >100 mL/minute; then He stream
while heating to 662° F., 90 psi, 120 mL/minute.

| Time | LHSV | $T_o$ | $T_i$ | P | ΔP | CO | CH₃OH | Me₂O | CH₄ | HCO₂CH₃ | CO₂ | S(CO) |
|---|---|---|---|---|---|---|---|---|---|---|---|---|
| 0.3 | 117 | 666 | 655 | 19 | 14 | 8.6 | 58.3 | 0.4 | 1.5 | 27.0 | 4.2 | 21 |
| 1.1 | 117 | 662 | 657 | 40 | 7 | 2.8 | 72.0 | 0.6 | 1.0 | 23.6 | 0 | 10 |
| 2.2 | 117 | 662 | 657 | 51 | 7 | 16.4 | 40.1 | 5.9 | 5.8 | 14.9 | 16.9 | 27 |
| 3.1 | 117 | 664 | 657 | 20 | 12 | 1.2 | 79.9 | 0.3 | 0.6 | 16.3 | 1.7 | 6 |
| 3.9 | 117 | 718 | 712 | 23 | 13 | 6.2 | 51.3 | 0.8 | 2.6 | 32.2 | 6.8 | 13 |
| 4.6 | 117 | 720 | 716 | 45 | 7 | 30.2 | 26.6 | 5.4 | 8.0 | 7.1 | 22.7 | 41 |
| 5.5 | 117 | 716 | 712 | 50 | 7 | 45.5 | 0 | 8.2 | 12.4 | 0 | 33.8 | 46 |
| 13.6 | 117 | 714 | 714 | 23 | 12 | 1.2 | 90.2 | 0.2 | 0.3 | 6.9 | 1.2 | 12 |
| 14.2 | 117 | 774 | 765 | 18 | 14 | 5.2 | 75.0 | 1.0 | 1.4 | 13.1 | 4.3 | 21 |
| 16.2 | 117 | 833 | 826 | 20 | 15 | 9.6 | 75.0 | 2.7 | 0.5 | 5.9 | 6.4 | 38 |
| 18.9 | 117 | 829 | 826 | 50 | 7 | 52.5 | 3.5 | 12.0 | 3.4 | 0 | 28.5 | 54 |
| 24.9 | 117 | 939 | 930 | 29 | 16 | 55.7 | 7.9 | 7.9 | 2.5 | 0.2 | 25.6 | 60 |
| 25.7 | 117 | 925 | 921 | 10 | 28 | 46.0 | 23.3 | 6.6 | 1.9 | 1.7 | 19.7 | 60 |
| 36.4 | 117 | 937 | 930 | 10 | 34 | 31.6 | 51.5 | 4.7 | 1.7 | 0.6 | 9.1 | 65 |
| 37.5 | 117 | 986 | 979 | 10 | 33 | 60.0 | 17.3 | 4.2 | 3.2 | 0.2 | 16.0 | 73 |
| 38.4 | 117 | 988 | 981 | 30 | 8 | 79.1 | 0 | 1.5 | 5.1 | 0 | 13.7 | 79 |
| 45.5 | 117 | 714 | 711 | 20 | 22 | 1.8 | 96.3 | 0.4 | 0.1 | 0.5 | 0.5 | 49 |

Units:
Time = h; flow = mL/minute; LHSV = liquid hourly space velocity = $h^{-1}$; $T_{out}$ = bath temperature (°F.); $T_{in}$ = thermowell temperature (°F.); P = pressure (psi); ΔP = pressure drop across the reactor; S(CO) = selectivity to CO.

DISCUSSION

The most active industrial catalysts for the synthesis of methanol from CO and $H_2$ contain copper. Although the oxidation state of copper in these catalysts is yet to be established, there is strong evidence to suggest that Cu(I) is the active species. (Klier, K., Adv. Cat., 1982, 31, 243; Ghiotti, G., Boccuzzi, F., Catal. Rev. Sci. Eng., 1987, 29 (2&3), 151; Klier, K., Herman, R. G., Nunan, J. G., Smith, K. J., Bogdan, C. E., Young, C. W., Santiesteban, J. G., in "Methane Conversion", Ed. Bibby, D. M., Chang, C. D., Howe, R. F., Yurchak, S. L., "Studies in Surface Science and Catalysis", Vol. 36, Elsevier, New York, 1988, 109). Stabilization of copper by a second catalyst component is required for high synthesis activity, as supported copper catalysts alone have low or zero activity in the methanol synthesis reaction. (Klier, K., Adv. Cat., 1982, 31, 243; Ghiotti, G., Boccuzzi, F., Catal. Rev. Sci. Eng., 1987, 29 (2&3), 151; Klier, K., Herman, R. G., Nunan, J. G., Smith, K. J., Bogdan, C. E., Young, C. W., Santiesteban, J. G., in "Methane Conversion", Ed. Bibby, D. M., Chang, C. D., Howe, R. F., Yurchak, S. L., "Studies in Surface Science and Catalysis", Vol. 36, Elsevier, New York, 1988, 109). The reverse reaction is the dehydrogenation of methanol. According to the principle of microscopic reversibility, a catalyst which promotes methanol synthesis should also catalyze the methanol decomposition reaction.

Preliminary results indicate that catalysts prepared with copper (I) chloride as a component in a molten salt eutectic are very active in the dehydrogenation of methanol. It is believed that Cu(I) is the active species in the catalysts, although extensive characterization of these catalysts is necessary before this can be conclusively established. Complex chlorocuprate (I) ions ($CuCl_n^{1-n}$, n=2, 3 or 4) form when CuCl is treated with excess chloride ion in aqueous solution. (Massey, A. G., in "Comprehensive Inorganic Chemistry", (Bailar, J. C., Emeleus, J. C., Nyholm, Sir R., and Trotman-Dickenson, A. F., Eds.), vol. 3, Pergammon: Oxford, 1973). The high activity of catalysts tested may be attributed to stabilization of Cu(I) through a similar reaction taking place in the molten salt phase. Very recently, King and co-workers reported that alkali metal chloride-promoted copper catalysts are active in methanol synthesis. (Chu, P. J., Gerstein, B. C., Sheffer, G. R., King, T. S., J. Catal., 1989, 115, 194; Sheffer, G. R., King, T. S., J. Catal., 1989, 115, 376). These workers present strong evidence for the presence of Cu(I) in the active catalyst. Their results suggest that Cu(I) may play a role in our catalysts as well.

The methanol decomposition activity of supported copper catalysts can be significantly enhanced by the addition of metal oxide promoters. (Ai, M., Appl. Catal., 1984, 11, 259). This phenomenon was observed in our ZnO-promoted, supported CuCl/KCl catalysts. It was found that activity increased for some catalysts with increased amounts of added zinc promoter.

In a flow reactor system, the rate of a chemical reaction is the product of LHSV and the extent of reactant conversion. In the experiments, the rate of methanol conversion was influenced by changes in temperature, pressure, catalyst composition, and elapsed time on stream. Methanol conversion increased when the reaction temperature was elevated. This effect may be due to thermodynamic and kinetic factors. Increased temperature causes a shift in the thermodynamic equilibrium of the reaction toward formation of CO and $H_2$, because it is an endothermic process. The reaction kinetics also change with an increase in temperature. The rate constant for the reaction should increase in accord with the Arrhenius equation, Equation 2.

$$lnk = -(E_a/RT) + \text{constant} \quad (2)$$

The rate of reaction is also increased by elevating the pressure in the reactor system. At higher pressures, the longer residence time of methanol in the reactor increases its contact time with the catalyst. This may play a role in increasing conversion. The magnitude of the increase in conversion that occurs as a result of only moderate changes in the reactor pressure, however, indicates that other factors are operative. Henry's Law states that the solubility of a gaseous species in a liquid increases as the gas pressure exerted on the liquid is increased. Therefore, the solubility of methanol in the molten salt layer should increase at higher pressures, and more reactant molecules should encounter active catalyst sites within the molten salt.

Figure 6:
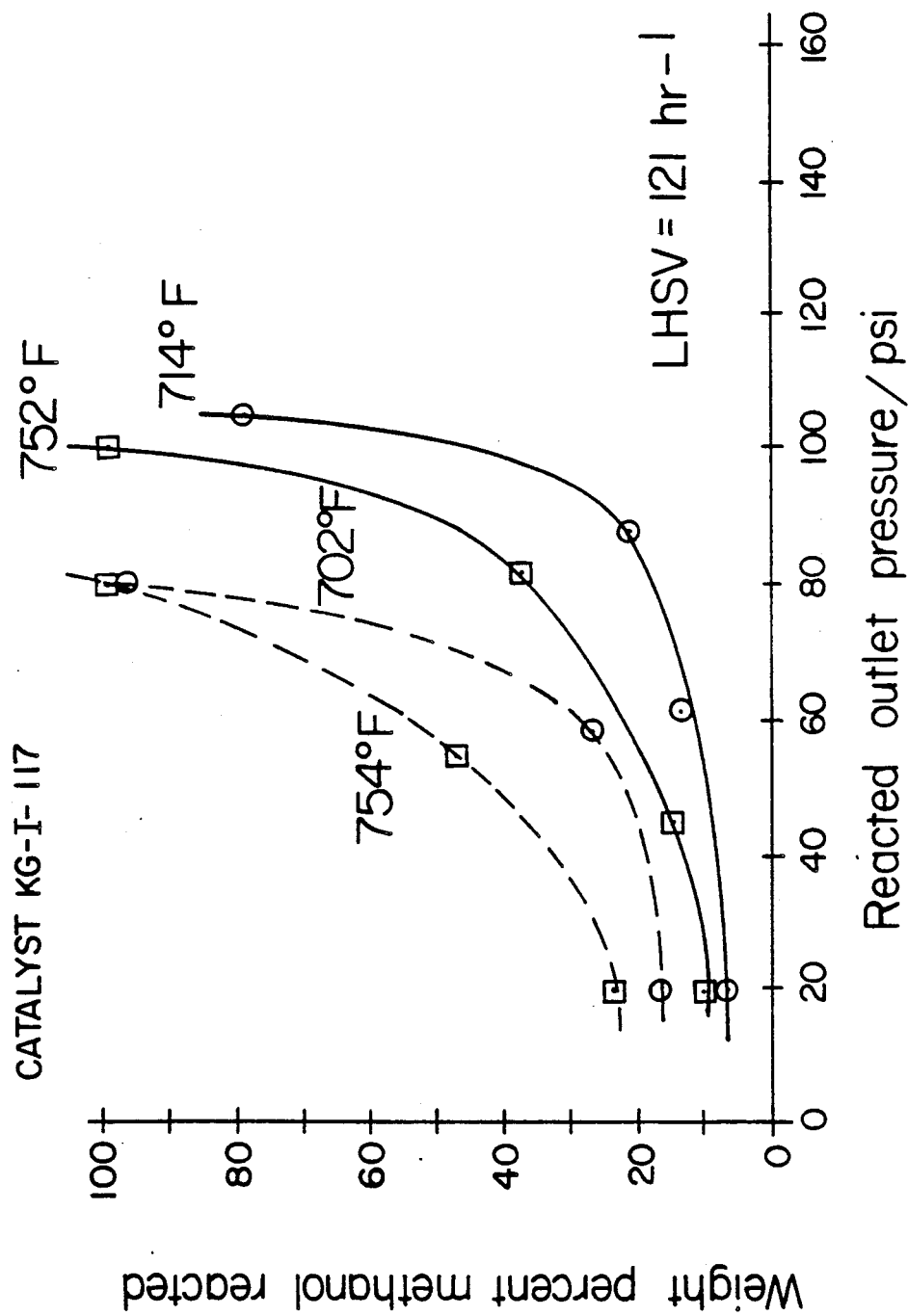
FIG. 6 is a plot of weight percent methanol reacted versus reactor outlet pressure using catalyst KG-I-117 with the solid curves showing data from initial tests at indicated temperatures, and the broken curves showing data from tests at indicated temperatures following high temperature (up to 977° F. for 3.5 hours) testing.
Figure 7:
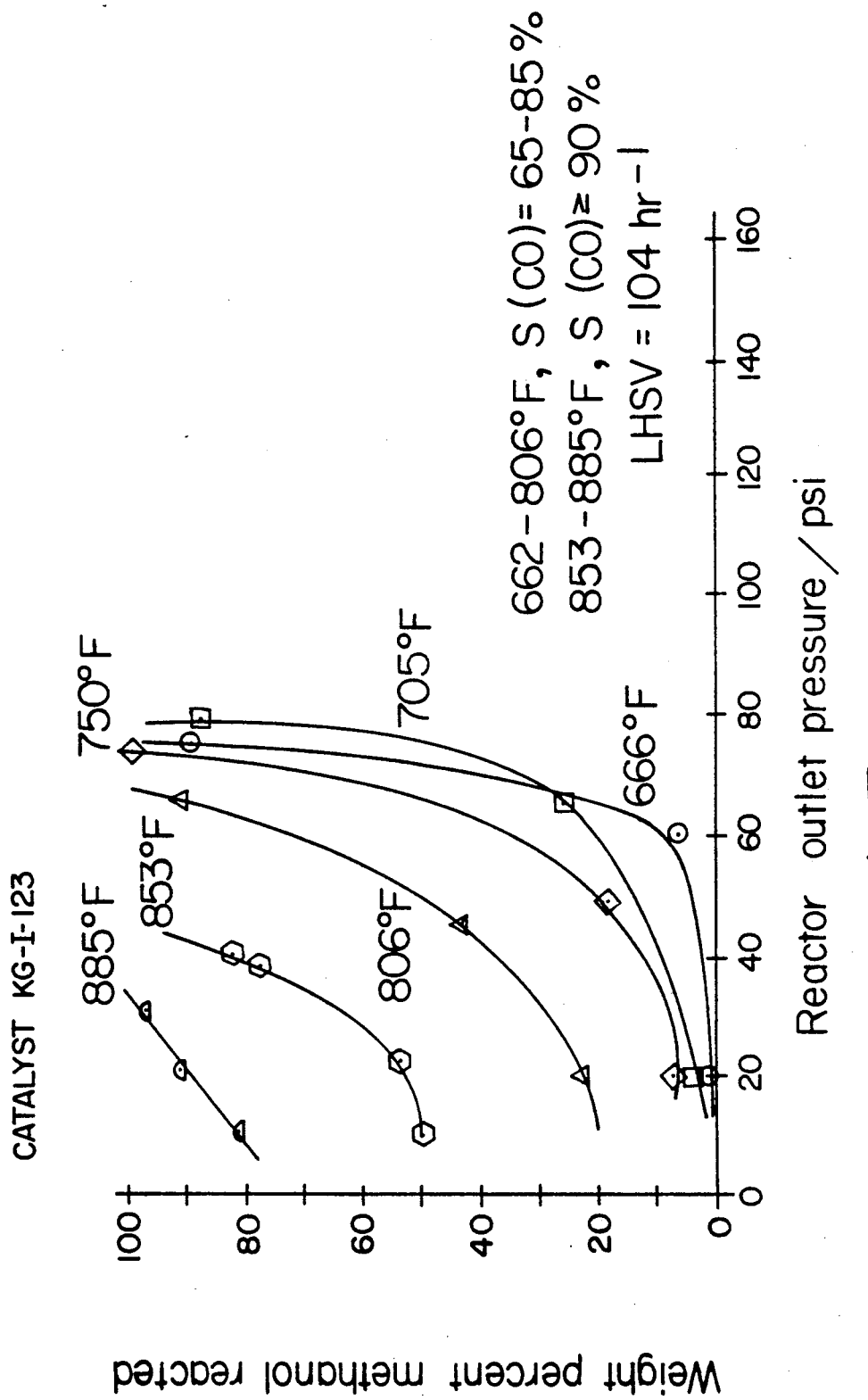
FIG. 7 is a plot of weight percent methanol reacted versus reactor outlet pressure using catalyst KG-I-123.
Figure 8:
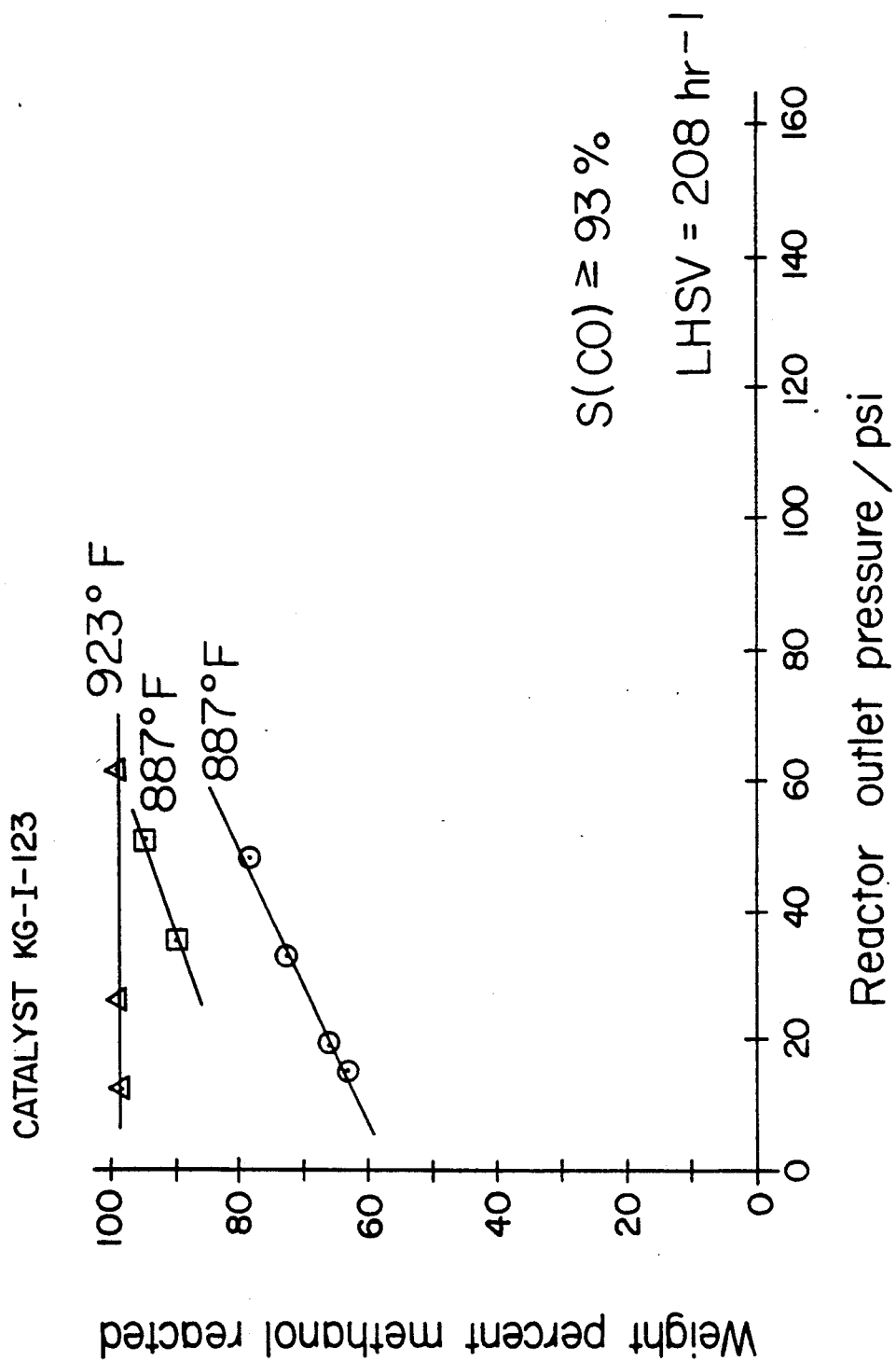
FIG. 8 is a plot of weight percent methanol reacted versus reactor outlet pressure using catalyst KG-I-123 with the showing data from initial tests at 887° F. and showing data from tests at 887° F. collected 10 hours after initial testing.
Figure 11:
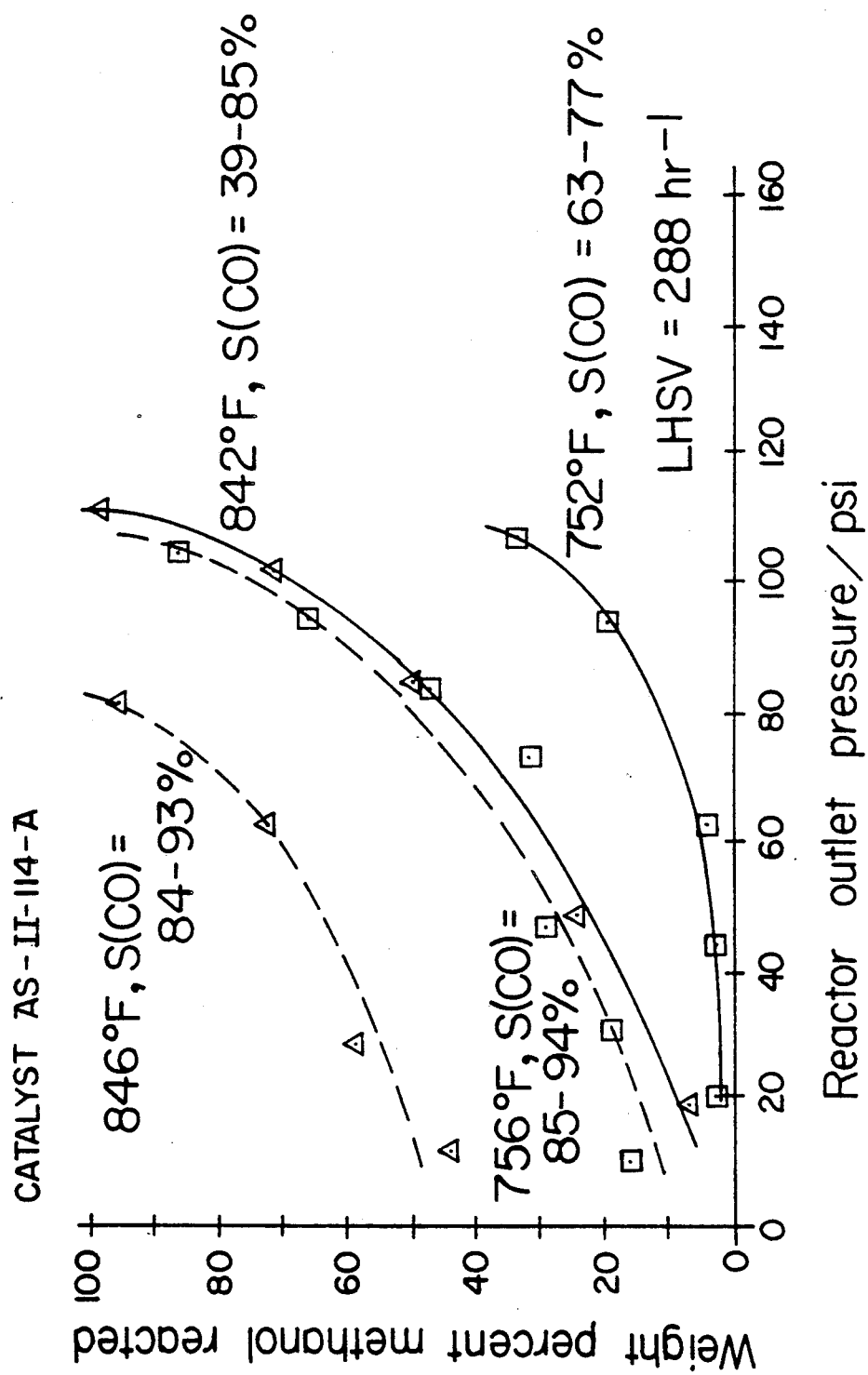
FIG. 11 is a plot of weight percent methanol reacted versus reactor outlet pressure using catalyst AS-II-114-A with the solid curves showing data from initial tests at indicated temperatures and the broken curves showing data from tests at indicated temperatures following high temperature (up to 986° F. for 3 hours) testing with the elapsed time on stream from initial testing being 23.3 hours.

Copper-containing supported molten salt catalysts require an induction period to give maximum methanol dehydrogenation activity. The length of the induction period is not clearly defined, because test conditions were varied throughout the experiments. An increase in conversion as a function of time on stream was noted for all the catalysts, as demonstrated in FIGS. 6, 8, and 11. In addition, no significant deactivation was observed, even after extended reaction times.

The selectivity of the reaction for carbon monoxide, S(CO), was influenced primarily by temperature, degree of methanol conversion, elapsed time on stream, and to a lesser extent, by pressure and catalyst composition. Carbon monoxide and hydrogen were the major products of the reaction, and other products generally represented less than 5% by weight of the product mixture. Catalyst testing was initiated at approximately 665° F., usually at relatively low pressure (20 psi). These conditions produced the lowest selectivity to CO. The S(CO) increased with time on stream, especially within the first several hours of the catalyst test. As the temperature was increased, both conversion and S(CO) increased. Subsequently, the selectivity of the reaction at a given temperatures remained high (usually 90-98%) over a wide range of pressures. Only at the highest pressures tested at each temperature did the S(CO) decrease, usually corresponding to pressures exceeding what was required for >95% methanol conversion.

Concerning the induction period and temperature dependence observed for these SMSC catalysts, it is possible that a portion of the Cu(I) component of the molten salt was oxidized to Cu(II) during catalyst preparation; however, efforst were made to avoid this reaction. The presence of Cu(II) salts in the catalysts may dilute the active Cu(I) phase, elevate the eutectic melting point, or both. Full catalyst activity may not be realized until these catalysts have been used at high temperatures (i.e., 22 800° F.) under the reaction conditions. This treatment may result in liquid layer homogenation and/or Cu(II) reduction.

Two experiments (1 and 4) were conducted to determine the effect of the support on the activities of SMSC catalysts. Silica and alumina supports were loaded with a CuCl/KCl mixture to give approximately 30% liquid loading. The alumina-based catalyst had a lower selectivity to carbon monoxide at temperatures >840° F. than did the catalyst prepared using the silica support. The major difference was the presence of increased amounts of dimethyl ether ($CH_3OCH_3$) in the product stream for the alumina-based catalyst. Dimethyl ether is produced by an intermolecular dehydration reaction (Equation 3), which is catalyzed by acidic sites on the support.

$$2CH_3OH \rightarrow CH_3OCH_3 + H_2O \qquad (3)$$

Alumina has a total acidity (Lewis plus Bronsted) which is four times greater than that for silica. (Bell, A. T., in "Catalyst Design (Progress and Perspectives), Hegedus, L. L., Ed.; Wiley: New York, 1987, p. 103). It has been shown that dimethyl ether is the favored methanol dehydrogenation product when alumina-supported copper catalysts are tested at 356° F. and 1 atm pressure. (Ai, M., Appl. Catal. 1984, 11, 259). In the experiments, the S(CO) values were nearly identical for the two supports at temperatures >840° F. (see Experiments 1 and 4). In addition, the alumina-supported catalyst showed higher activity at all temperatures.

As discussed previously, zinc nitrate was added to supported CuCl/KCl catalysts. These resulting materials were heated to 660°-680° F. to decompose the nitrate salt to ZnO. The thermolysis temperature was sufficiently high to insure that the transformation would take place. (Addison, C. C., Logan, N., Adv. Inorg. Chem Radiochem., 1974, 6, 71). For the purpose of this disclosure, the zinc phase of these molten salt catalysts will be referred to as zinc oxide, ZnO.

Added zinc oxide promoted the activity of $CuCl/KCl/SiO_2$ catalyst KG-I-113. This behavior is illustrated by comparison of data for Experiments 1 and 2 under similar reaction conditions. The values of S(CO) were not influenced by the addition of ZnO.

Figure 2:
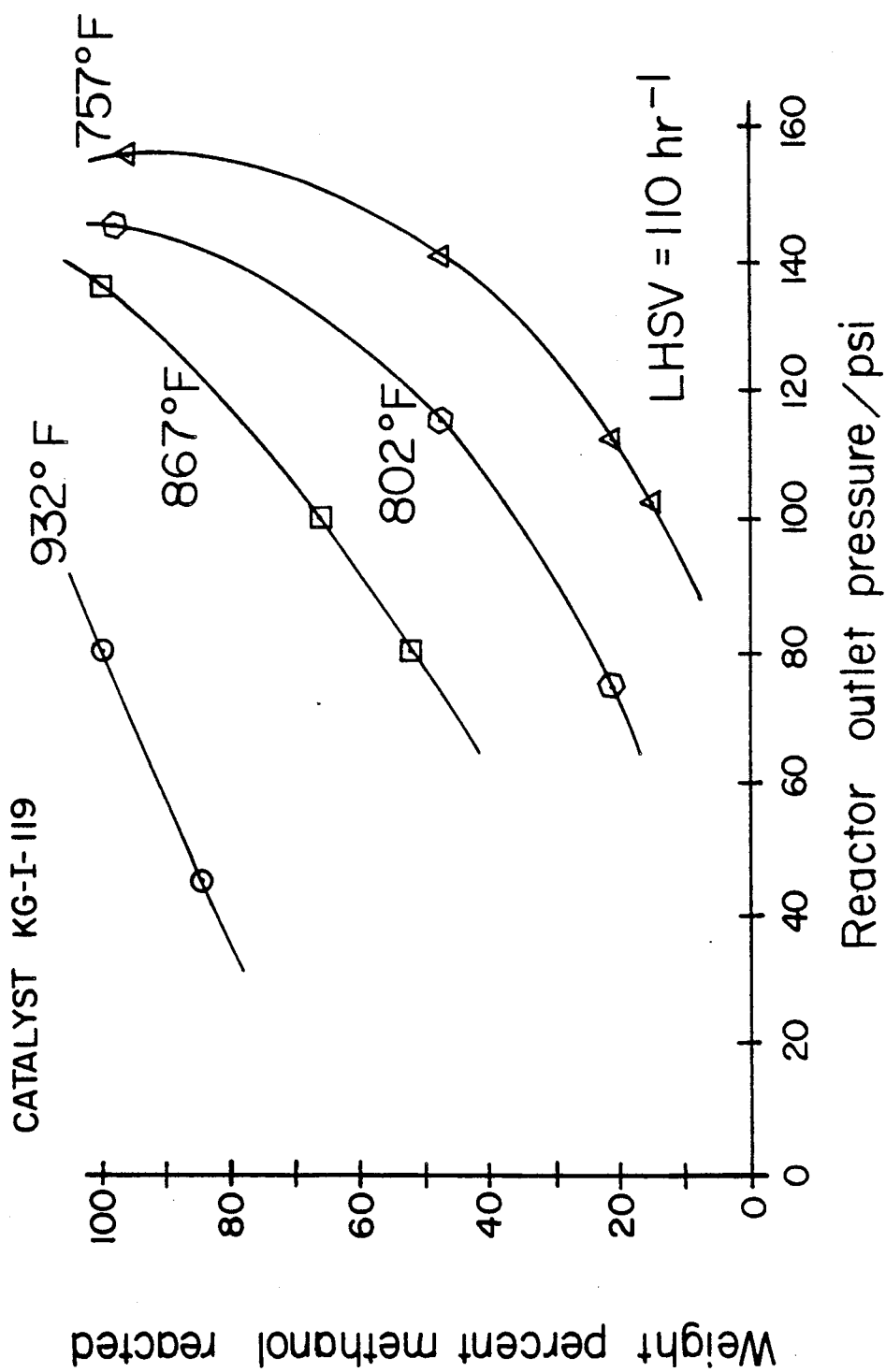
FIG. 2 is a plot of weight percent methanol reacted versus reactor outlet pressure using catalyst KG-I-119.
Figure 3:
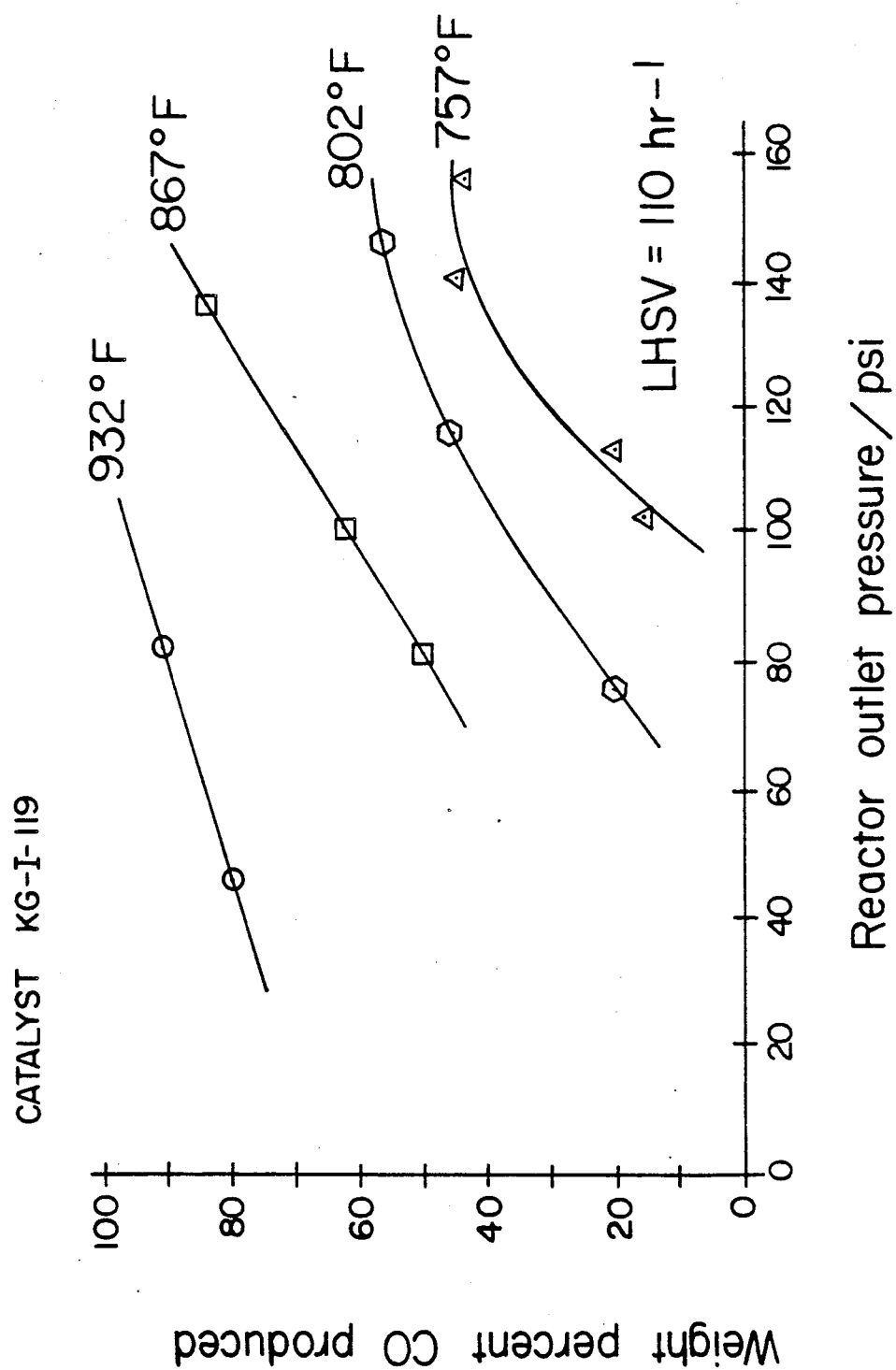
FIG. 3 is a plot of weight percent carbon monoxide produced versus reactor outlet pressure using catalyst KG-I-119.
Figure 4:
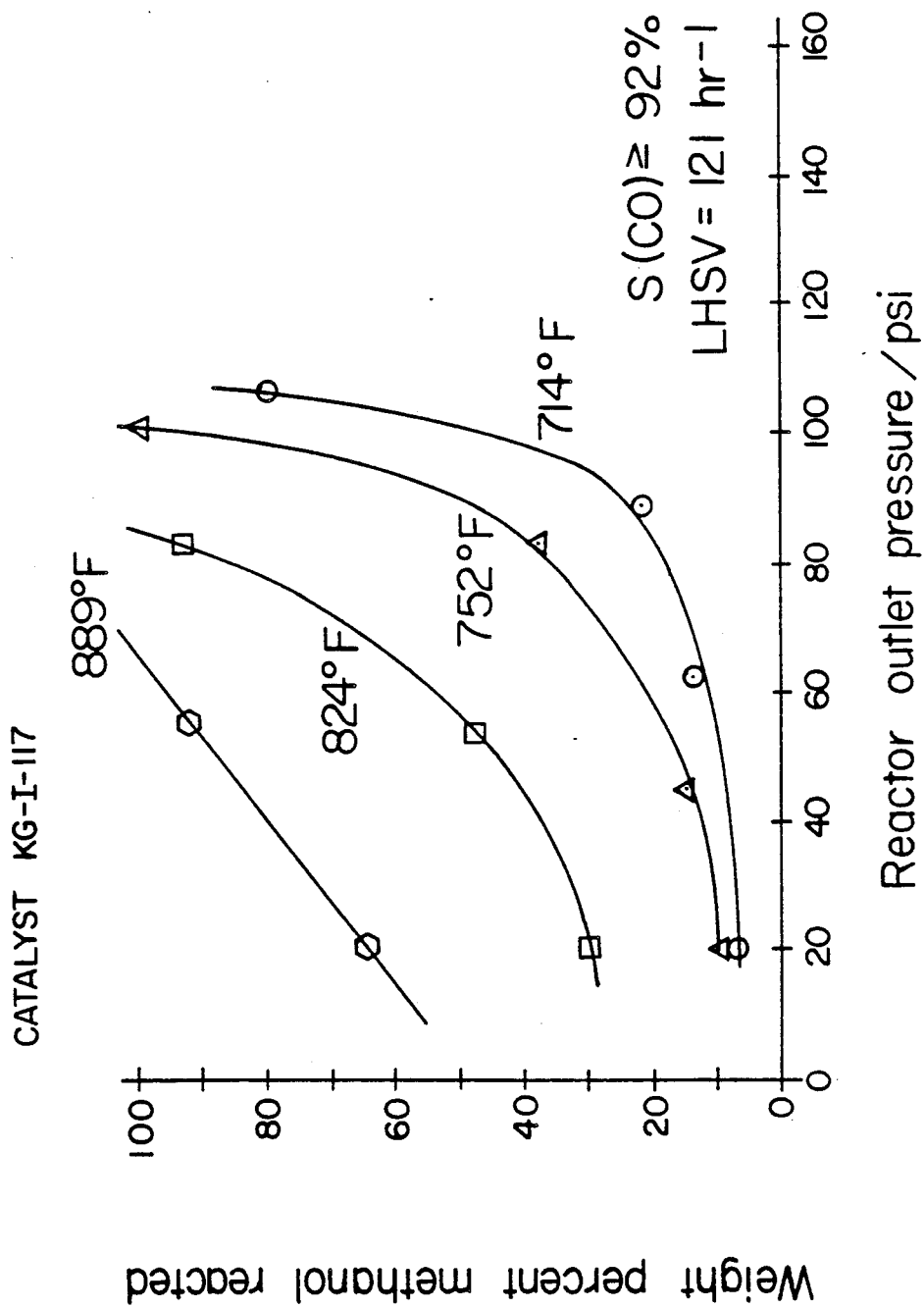
FIG. 4 is a plot of weight percent methanol reacted versus reactor outlet pressure using catalyst KG-I-117.
Figure 5:
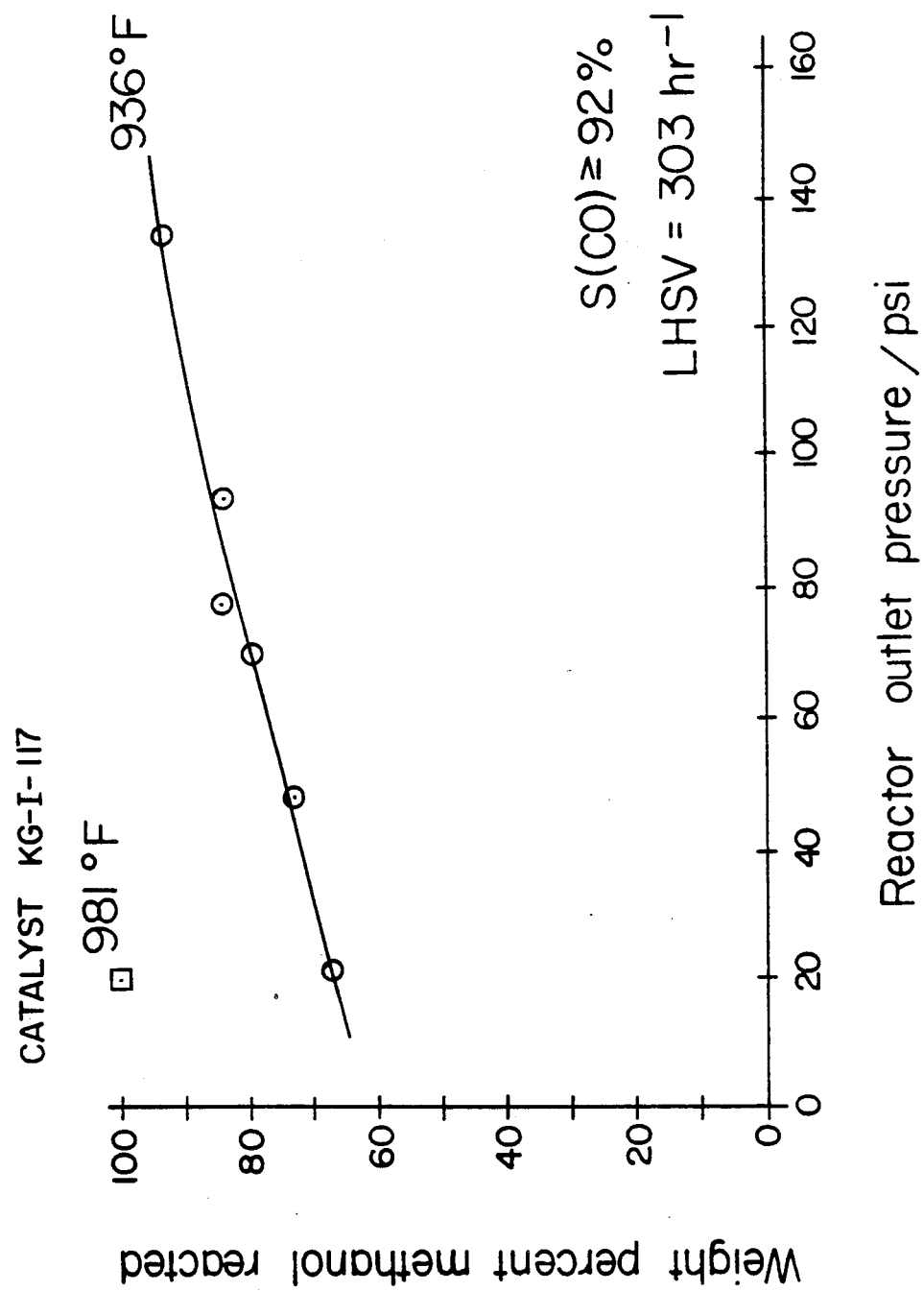
FIG. 5 is a plot of weight percent methanol reacted versus reactor outlet pressure using catalyst KG-I-117.

When more ZnO was added to KG-I-113, the activity for methanol decomposition also increased. Comparison of the graphical representations of the data for Experiments 2 and 3 illustrates this trend. FIG. 2 shows that at 755° F. and at a LHSV of approximately 115 $h^{-1}$, the catalyst which contained only 17.3 weight percent ZnO (KG-I-119) gave 15% methanol conversion. Catalyst KG-I-117 (29.4 weight percent ZnO) gave a 100% conversion under these conditions, FIG. 4. In a second example, a temperature of 932° F. was required in order to attain 90% methanol conversion at 60 psi pressure for catalyst KG-I-119. For catalyst KG-I-117, the same conversion was observed at only 889° F. under similar conditions. Thus, KG-I-113-derived catalysts containing zinc oxide are more active than KG-I-113, and increased ZnO concentrations allow higher conversion at lower temperatures and/or pressures.

In general, the selectivity for CO formation also increased as the amount of zinc oxide was increased. Although the S(CO) was high in all cases, there is sufficient evidence which supports a subtle increase due to the ZnO component.

In order to test the effect of varying the concentration of CuCl in the molten salt layer of the catalyst, a catalyst containing 68 mol % CuCl (KG-I-131) was prepared. This material was tested at temperatures as low as 670° F. (Experiment 5), well above the melting point of this eutectic composition (302° F.). Zinc oxide was incorporated into a sample of KG-I-131 to give catalyst AS-II-114-A, which was also tested (Experiment 6).

Figure 9:
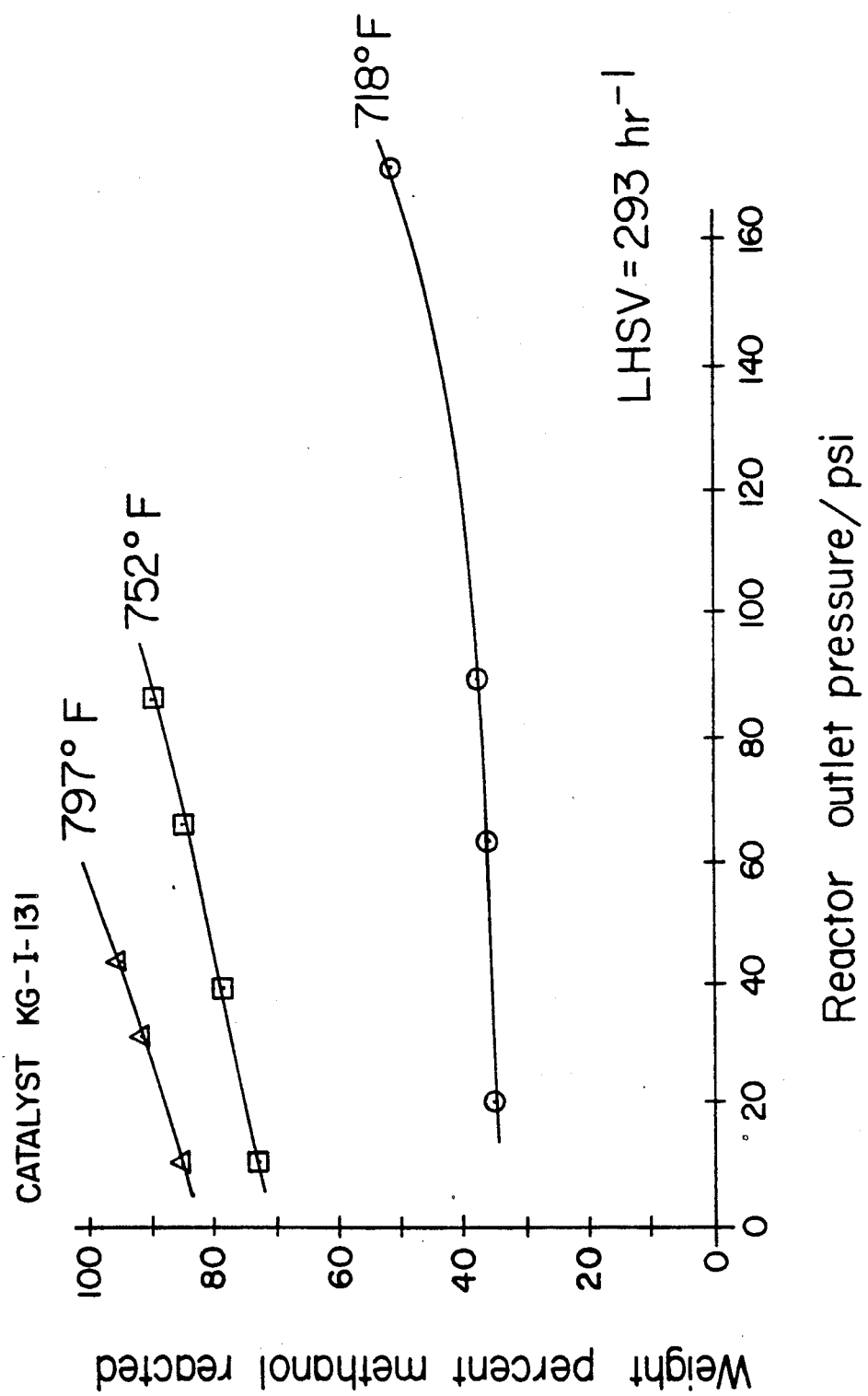
FIG. 9 is a plot of weight percent methanol reacted versus reactor outlet pressure using catalyst KG-I-131.
Figure 10:
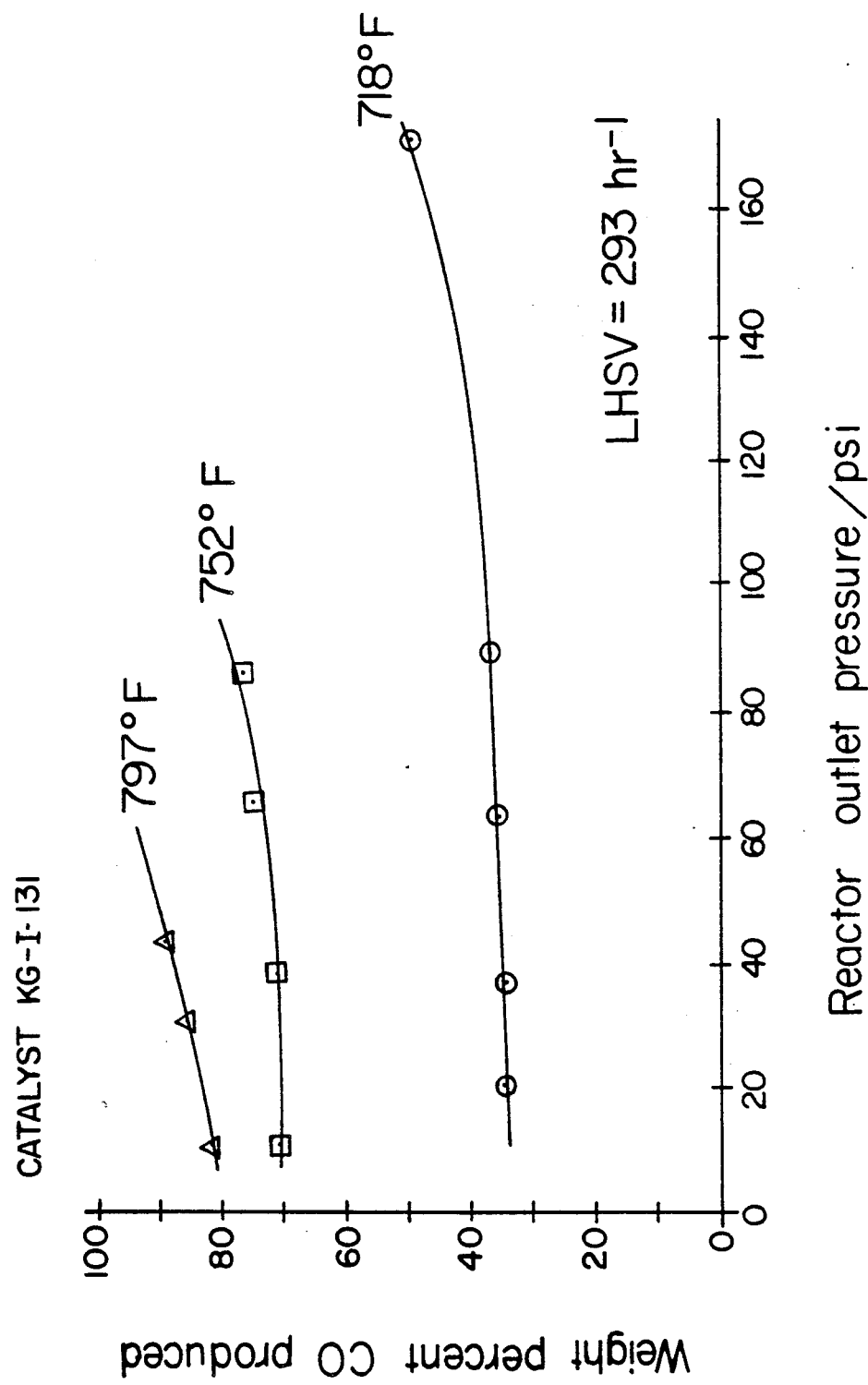
FIG. 10 is a plot of weight percent carbon monoxide produced versus reactor outlet pressure using catalyst KG-I-131.

Several discrepancies in the data arose in the testing of KG-I-131 catalyst prior to time 146.15 hours. In all previous tests of CuCl-containing SMSC catalysts, the rate of methanol conversion at a given temperature increased as pressure was increased. Due to a liquid pump malfunction, the flow rate of liquid methanol into the reactor fluctuated, but was continuous, early in this test run. The problem was corrected, and reliable data were subsequently obtained. FIGS. 9 and 10 were plotted from data at a reaction time ≦146.15 hours. Although initial data for this experiment were not completely reliable, the resiliency and durability of the catalyst was adequately demonstrated. After 160 hours of continuous operation, the catalyst was still very active.

Comparison of catalysts KG-I-113 and 131 (Experiments 1 and 5) illustrates the increased activity of catalyst KG-I-131. As an example, at approximately 720° F., catalyst KG-I-113 gave 52% methanol conversion at LHSV=61 $h^{-1}$ and 195 psi, with S(CO)=92%. Catalyst KG-I-131 gave 52% methanol conversion at LHSV=293 $h^{-1}$ and 170 psi, with S(CO)=96%. Thus, the activity of the catalyst and the S(CO) were improved by the decrease in CuCl concentration in the molten salt eutectic.

Surprisingly, the activity of KG-I-131 decreased as a result of zinc oxide incorporation. This is contrary to what was observed for the SMSC catalysts which contained a higher percentage of CuCl. At a LHSV of approximately 290 $h^{-1}$ at 752° F. and 60 psi reactor pressure, catalyst KG-I-131 gave 84% methanol conversion with approximately 89% selectivity to CO. Catalyst AS-II-114-A gave only 30% conversion, with a S(CO) of approximately 93%. Thorough examination of the effect of catalyst composition on reaction rate and product selectivity will be required to determine the optimal combination of catalyst components for future SMSC studies.

As indicated above, supported CuCl/KCl catalysts have very high activity in the methanol dehydrogenation reaction. Increases in catalyst activity and S(CO) were observed as the time on-stream increased. Testing at high temperatures (>970° F.) results in an increase in both lower-temperature catalyst activity and in S(CO). The high resiliency of our catalyst is unmatched by that of previously reported catalysts. For example, Cowley and Gebhard reported poor resiliency for catalysts they tested, even though optimization of catalyst resiliency was the goal of their investigation. (Cowley, S. W., Gebhard, S. C., Colorado School of Mines Quarterly, 1983, 41). In addition, their reported LHSV (1.6 g MeOH/g cat.h) are far lower than our LHSV values (48 to 240 g MeOH/g cat.h). The resiliency of our catalysts is best demonstrated in FIGS. 6, 8, and 11.

A commercial methanol synthesis catalyst (UCI-L-1968) was tested as a standard for comparison with our SMSC catalysts. Over a wide range of temperatures (662°-986° F.), our SMSC catalysts were superior in methanol dehydrogenation rate and selectivity to carbon monoxide. In addition, the UCI catalyst deactivated over time on stream, as detailed in Table 5.

TABLE 5

| Deactivation of the UCI-L-1968 catalyst with time on stream.* | | |
|---|---|---|
| Elapsed reaction time (h) | Weight percent methanol reacted | % Decrease |
| 3.87 | 48.7 | — |
| 13.57 | 9.8 | 75.8 |

TABLE 5-continued

Deactivation of the UCI-L-1968 catalyst with time on stream.*

| Elapsed reaction time (h) | Weight percent methanol reacted | % Decrease |
|---|---|---|
| 43.53 | 3.7 | 6.8 |

*Test conditions: LHSV = 117 h$^{-1}$, 716° F., and 22 psi.

CONCLUSIONS

The results of the experiments indicate that copper (I)-containing molten salt catalysts, either alone or with added ZnO promoter, show promising catalytic activity for the endothermic dehydrogenation of methanol. Significantly, all of these catalysts maintained catalytic activity for long periods of time without appreciable coking or deactivation. The catalysts also showed resiliency when heated to high temperature (930° F.) for extended periods, followed by cooling to moderate temperatures (660°-840° F.). This is in contrast to existing methanol dehydrogenation catalysts, which exhibit significant decreases in catalytic activity upon return to low temperature after high-temperature testing. (Cowley, S. W., Gebhard, S. C., Colorado School of Mines Quarterly, 1983, 41). The marked pressure effect observed with the SMSC catalysts may be attributed to increased solubility of methanol in the molten salt phase at high pressures. High selectivity for carbon monoxide was uniformly achieved. The activity and selectivity increased upon addition of ZnO for some catalysts.

The experiments clearly demonstrate the feasibility of applying the SMSC technique to the problem of methanol dehydrogenation. Preliminary results indicate that this technology shows considerable promise for industrial applications.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

We claim:

1. A process for the endothermic dehydrogenation of methanol, comprising the steps of:
    preparing a supported molten salt catalyst including copper; and
    exposing methanol to said catalyst under conditions that promote dehydrogenation, wherein said supported molten salt catalyst includes a porous substrate and a molten salt mixture disposed to coat the surface area of said substrate, wherein said molten salt mixture includes CuCl and KCl.

2. The process of claim 1 wherein said molten salt mixture includes from about 60 to about 90 mole percent CuCl, and from about 10 to about 40 mole percent KCl.

3. The process of claim 2 wherein said molten salt mixture includes about 85 mole percent CuCl and about 15 mole percent KCl.

4. The process of claim 2 wherein said molten salt mixture includes about 68 mole percent CuCl and about 32 mole percent KCl.

* * * * *